(12) United States Patent
Flanders et al.

(10) Patent No.: US 9,064,308 B2
(45) Date of Patent: Jun. 23, 2015

(54) SYSTEM AND METHOD FOR RESIDUAL ANALYSIS OF IMAGES

(75) Inventors: Bradley A. Flanders, Whittier, CA (US); Ian S. Robinson, Redondo Beach, CA (US)

(73) Assignee: Raytheon Company, Waltham, MA (US)

( * ) Notice: Subject to any disclaimer, the term of this patent is extended or adjusted under 35 U.S.C. 154(b) by 32 days.

(21) Appl. No.: 13/542,181

(22) Filed: Jul. 5, 2012

(65) Prior Publication Data

US 2014/0010471 A1    Jan. 9, 2014

(51) Int. Cl.
*G06K 9/40* (2006.01)
*G06T 5/00* (2006.01)
*G06T 5/50* (2006.01)

(52) U.S. Cl.
CPC . *G06T 5/002* (2013.01); *G06T 5/50* (2013.01); *G06T 2207/10036* (2013.01)

(58) Field of Classification Search
CPC .................. G06T 7/0002; G06T 7/004; G06T 2207/10036; G06T 2207/10032; G06T 5/002; G06K 9/46
See application file for complete search history.

(56) References Cited

U.S. PATENT DOCUMENTS

| | | | |
|---|---|---|---|
| 6,008,492 A | 12/1999 | Slater et al. | |
| 6,075,891 A | 6/2000 | Burman | |
| 6,208,752 B1 | 3/2001 | Palmadesso et al. | |
| 6,504,943 B1 | 1/2003 | Sweatt et al. | |
| 6,535,632 B1 | 3/2003 | Park et al. | |
| 6,665,438 B1 | 12/2003 | Lin | |
| 6,678,048 B1 | 1/2004 | Rienstra et al. | |
| 6,701,021 B1 | 3/2004 | Qian et al. | |

(Continued)

FOREIGN PATENT DOCUMENTS

| CN | 101763445 A | 6/2010 |
|---|---|---|
| WO | 2010141114 A2 | 12/2009 |
| WO | 2010056254 A1 | 5/2010 |

OTHER PUBLICATIONS

Acito N. et al., "Subspace-Based Striping Noise Reduction in Hyperspectral Images", IEEE Transactions on Geoscience and Remote Sensing, IEEE Service Center, Piscataway, NJ, US, vol. 49, No. 4, Apr. 1, 2011, pp. 1325-1342.

(Continued)

*Primary Examiner* — Barry Drennan
*Assistant Examiner* — Guillermo Rivera-Martinez
(74) *Attorney, Agent, or Firm* — Burns & Levinson LLP; Joseph M. Maraia

(57) ABSTRACT

In accordance with various aspects of the disclosure, a system, a method, and computer readable medium having instructions for processing images is disclosed. For example, the method includes receiving an input datacube from which an input image is derived. The input datacube is transformed into a residual datacube by projecting out basis vectors from each spatial pixel in the input datacube, the residual datacube being used to derive a residual image. A statistical parameter value for samples of each focal plane pixel in the residual image is determined. Anomalous focal plane pixels are identified based upon a comparison of the determined statistical parameter value with the respective determined statistical parameter values of remaining focal plane pixels. Another comparison of residual values for each scanned sample of the identified anomalous focal plane pixels with values of corresponding scanned samples in the input datacube is performed.

20 Claims, 12 Drawing Sheets

(56) References Cited

U.S. PATENT DOCUMENTS

| | | | |
|---|---|---|---|
| 6,750,964 B2 | 6/2004 | Levenson et al. | |
| 6,782,138 B1 | 8/2004 | Leisner et al. | |
| 6,804,400 B1 | 10/2004 | Sharp | |
| 6,859,275 B2 | 2/2005 | Fateley et al. | |
| 6,940,999 B2 | 9/2005 | Lin | |
| 6,952,499 B1 | 10/2005 | Vititoe | |
| 7,180,588 B2 | 2/2007 | Geshwind et al. | |
| 7,194,111 B1* | 3/2007 | Schaum et al. | 382/103 |
| 7,251,376 B2* | 7/2007 | Qian et al. | 382/253 |
| 7,319,796 B1* | 1/2008 | Sharp | 382/248 |
| 7,356,201 B2 | 4/2008 | Gunther et al. | |
| 7,463,778 B2 | 12/2008 | Damera-Venkata | |
| 7,486,734 B2 | 2/2009 | Machida | |
| 7,505,608 B2* | 3/2009 | Portigal et al. | 382/103 |
| 7,680,337 B2 | 3/2010 | Gruninger et al. | |
| 7,773,828 B2 | 8/2010 | Sakata et al. | |
| 7,792,321 B2* | 9/2010 | Palmadesso et al. | 382/100 |
| 7,835,594 B2* | 11/2010 | Riley et al. | 382/299 |
| 8,018,647 B2 | 9/2011 | Rice et al. | |
| 8,150,195 B2 | 4/2012 | Demirci et al. | |
| 8,165,344 B2 | 4/2012 | Shirasaka | |
| 8,175,393 B2 | 5/2012 | Robinson et al. | |
| 8,315,472 B2 | 11/2012 | Robinson et al. | |
| 8,391,961 B2 | 3/2013 | Levenson et al. | |
| 8,675,989 B2 | 3/2014 | Robinson et al. | |
| 2002/0114533 A1* | 8/2002 | Smith et al. | 382/275 |
| 2003/0012398 A1 | 1/2003 | Sunshine et al. | |
| 2004/0218172 A1 | 11/2004 | DeVerse et al. | |
| 2005/0047670 A1* | 3/2005 | Qian et al. | 382/253 |
| 2006/0188161 A1 | 8/2006 | Gruninger et al. | |
| 2006/0233421 A1 | 10/2006 | Portigal et al. | |
| 2006/0247514 A1 | 11/2006 | Panasyuk et al. | |
| 2007/0076955 A1 | 4/2007 | Schaum et al. | |
| 2009/0074297 A1* | 3/2009 | Robinson | 382/191 |
| 2010/0158330 A1 | 6/2010 | Guissin et al. | |
| 2010/0303371 A1* | 12/2010 | Robinson et al. | 382/254 |
| 2012/0224782 A1 | 9/2012 | Robinson et al. | |
| 2012/0314920 A1 | 12/2012 | Prigent et al. | |

OTHER PUBLICATIONS

Dyk A. et al., "Processing Hyperion and Ali For Forest Classification", IEEE Transactions on Geoscientce and Remote Sensing, IEEE Service Center, Pscataway, NJ, US vol. 41, No. 6, Jun. 1, 2003, pp. 1321-1331.

Datt B. et al., "Preprocessing eo-1 Hyperion Hyperspectral Data to Support the Application of Agricultural Indexes", IEEE Service Center, Piscataway, NJ, US, vol. 41, No. 6, Jun. 1, 2003, pp. 1246-1259.

Han T. et al., Detection and Correction of Abnormal Pixels in Hyperion Images, IGARSS 2002 International Geoscience and Remote Sensing Symposium. Toronto, Sweden, Jun. 24-28, 2002; [IEEE International Geoscience and Remote Sensing Symposium], New York, NY, vol. 3, pp. 1327-1330.

Parente, M. "A New Approach to Denoising CRISM Images", 39th Lunar and Planetary Science Conference, Mar. 10-14, 2008, LPI Contribution No. 1391, pp. 2528.

Manolakis et al., "Is There a Best Hyperspectral Detection Algorithm?", SPIE- Newsroom; pp. 1-3 (2209), (Jun. 17, 2009).

Boardman, J., et al., Mapping Target Signatures Via Partial Unmixing of Aviris Data, Citeseer 1995.

Kuybeda, O., et al., Global Unsupervised Anomaly Extraction and Discrimination in Hyperspectral Images via Maximum Orthogonal-Complements Analysis, Feb. 2008, Department of Electrical Engineering Technion IIT, Haifa 32000, Israel, Retrieved from Internet<URL: http://webee.technion.ac.il/uploads/file/publication/684.pdf.

Sun, L., et al., "Improved Iterative Error Analysis for Endmember Extraction from Hyperspectral Imagery", SPIE Imaging Spectrometry XIII, vol. 708, pp. 400-407, Intro., Sec 2.2-pp. 3-5 (Aug. 2008).

Veganzones, M.A., et al., "Endmember Extraction Methods: A Short Review", pp. 400-407 (Sep. 2008).

Duran, O., et al., "A Time-Efficient Method for Anomaly Detection in Hyperspectral Images", IEEE Transactions on Geoscience and Remote Sensing, IEEE Service Ctr., NJ, US, vol. 45, No. 12, pp. 3894-3904 (Dec. 2007).

Plaza, A., et al., "Spatial/Spectral Endmember Extraction by Multi-dimensional Morphological Operations", IEEE Transactions on Geoscience and Remote Sensing, IEEE Service Ctr., NJ, US, vol. 40, No. 9, pp. 2025-2029 (Sep. 2002).

Plaza, A., et al., "A New Approach to Mixed Pixel Classification of Hyperspectral imagery based on extended Morphological profiles", Pattern Recognition, Elsevier, vol. 37, No. 6, pp. 1097-1116 (Jun. 2004).

Rogge, D.M., et al., "Integration of Spatial-Spectral Information for the Improved Extraction of Endmembers", Remote Sensing of Environment, Elsevier, vol. 110, No. 3, pp. 287-303 (Aug. 2007).

Filippi, A.M., et al., "Support Vector Machine-Based Endmember Extraction", IEEE Transactions on Geoscience and Remote Sensing, IEEE Service Ctr., NJ, US, vol. 47, No. 3, pp. 771-791 (Mar. 2009).

Keshava, N., et al., "Sprectral Unmixing", IEEE Signal Processing Magazine, vol. 19, No. 1, pp. 44-57, Jan. 1, 2002, XP011093745.

Rogge, D. M., et al., "Iterative Spectral Unmixing for Optimizing Per-Pixel Endmemeber Sets", IEEE Transactions on Geoscience and Remote Sensing, IEE Service Center, vol. 4, No. 12, pp. 3725-3736 (Dec. 2006).

Plaza, Antonio, et al., "A Quantitive and Comparative Analysis of Endmemeber Extraction Algorithms From Hyperspectral Data", IEEE 2004.

Robinson, I., et al. "Comparison of Hyperspectral Sub-Pixel Detection with and Without a Prior Knowledge of Target Features", Aerospace Conference, 1998 IEEE Snowmass at Aspen, Colorado, Mar. 21-28, 1998, vol. 5, pp. 183-189, Mar. 21, 1998, XP010287059, ISBN 978-0-7803-4311-5.

Winter, Michael, "Comparison of Approaches for Determining Endmembers in Hyperspectral Data", IEEE 2000.

Winter, Michael, "N-FINDR: An Algorithm for Fast Autonomous Spectral End-member Determination in Hyperspectral Data", SPIE 1999.

Ulug Bayazit, "Region Adaptive Spectral Transformation for Wavelet Based Color Image Compression", Image Processing (CIP), 2009 16th IEEE International Conference ON, IEEE, Piscataway, NJ, Nov. 7, 2009, pp. 2817-2820, Section 2 and 3.

Dohyun Ahn et al., "Rate-Distortion Optimized Image Compression Using Generalized Principal Component Analysis", Acoustics, Speech and Signal Processing , 2006. ICASSP 2006 Proceedings, 2006 IEEE International Conference on Toulouse, France 14-19, May 14, 2006, pp. 5-8.

Memarsadeghi, N. et al., "A Fast Implementation of the Isodata Clustering Algorithm", IJCGA, vol. 17, No. 1, pp. 71-103 (2007).

Wei, C-P, et al., "Empirical Comparison of Fast Clustering Algorithms for Large Data Sets", Proceedings of the 33rd Hawaii Int'l Conf. on System Sciences, pp. 1-10 (2000).

Yan, D, et al., "Fast Approximate Spectral Clustering", KDD'09, (9 pages) Jun. 28-Jul. 1, 2009, Paris, France.

International Preliminary Report on Patentability dated Aug. 29, 2011 of PCT/US2010/024192 filed Feb. 12, 2010 (21 pages).

Meza et al., "Applied Non-Uniformity Correction Algorithm for Striping Noise Removal in Hyperspectral Images", [Downloaded from the Internet: http://nuc.die.udec.cl/publications/papers/2010-NUCStrippingNoise.pdf on Nov. 20, 2012].

Jiang, Ming-Fei, et al., "A Robust estimation of Virtual Dimensionality in Hyperspectral Imagery," Computational Problem-Solving (ICCP), 2010 International Conference on, vol., No., pp. 374-378, Dec. 3-5, 2010.

Harsanyi, Joseph C., et al., "Hyperspectral Image Classification and Dimensionality Reduction: An Orthogonal Subspace Projection Approach," ZEEE Tmns. On Geoscience and Remote Sensing, 32(4), Jul. 1994.

Neville, R.A., et al., "Automatic Endmember Extraction from Hyperspectral Data for Mineral Exploration", 4th Int. Airborne remote Sensing Conf. Exhibition/21st Canadian Symposium on Remote Sensing, pp. 891-896 1999.

Orthogonality and Least Squares, http://www.aerostudents.com/files/linearAlgebra/orthogonalityLeast Squares.pdf, Jul. 2009.

(56) References Cited

OTHER PUBLICATIONS

Marco F. Durarte et al., "Structured Compressed Sensing: From Theory to Applications" IEEE Transactions on Signal Processing, IEEE Service Center, New York, vol. 59, No. 9, Sep. 1, 2011, pages.

Pickering M R et al., "Compression of Hyperspectral Data Using Vector Quantisation and the Discrete Cosine Transform", Image Processing, 2000, Proceedings. 2000 International Conference of Sep. 10-13, 2000, IEEE, Piscataway, NJ, Sep. 10, 2000, pp. 195-198, vol. 2.

International Search Report dated Apr. 27, 2011 of PCT/US2010/024192 filed Feb. 12, 2010 (18 pages).

International Search Report dated Feb. 9, 2009 of PCT/US2008/083738.

Manolakis et al., "Hyperspectral Image Processing for Automatic Target Detection Applications,", http://www.cis.rit.edu/-cnspci/references/dip/manolakis2003.pdf, 2003.

Leathers et al., "Scene-based Nonuniformity Corrections for Optical and SWIR Pushbroom Sensors", Optics Express; 13(13): 5136-5150 (Jun. 27, 2005).

Funk et al., "Clustering to improve matched filter detection of weak gas plumes in hyperspectral thermal imagery," IEEE Transactions on Geoscience and Remote Sensing; 39(7):1410-1420 (2001).

Halper, "Global, local and stochastic background modeling for target detection in mixed pixels," the MITRE Corp., Case#10-0838; 13 pages, Jun. 2010.

Kerekes et al., "Hyperspectral imaging system modeling," Lincoln Laboratory Journal; 14(1): 117-130 (2003).

Manolakis, "Standoff detection and identification of chemical plumes with long wave hyperspectral imaging sensors," MIT Lincoln Laboratory: RTO-MP-SET-151; pp. [2-1]-[2-10] 2009.

Messinger et al., "Detection of gaseous effluents from airborne LWIR hyperspectral imagery using physics-based signatures," Institute of Technology, pp. 712-723. Jul. 2006.

Ientilucci et al., "Target detection in a structured background environment using an infeasibility metric in an invariant space; algorithms and technologies for multispectral, hyperspectral and ultraspectral imagery XI," Proceedings of SPIE, v. 5806, pp. 491-502, 2005.

Jacobsen et al., "Monitoring grasslands using convex geometry and partial unmixing: a case study," 1st EARSeI Workshop on imaging spectroscopy, pp. 309-316; Oct. 1998.

Mundt et al., "Partial unmixing of hyperspectral imagery: Theory and Methods"; American Society of Photogrammetry and Remote Sensing annual conference, p. 1-12; May 2007.

Nielsen, "Spectral mixture analysis: linear and semi-parametric full and iterated partial unmixing in multi-and hyperspectral image data," International Journal of Computer Vision: v. 42; Nos. 1 and 2, pp. 17-37: 2001.

Smith, "Introduction to hyperspectral imaging," http://microimages.com; p. 1-24, Jul. 14, 2006.

Zhang et al., "A Novel classified Residual DCT for Hyperspectral Images Scalable Compression", Picture coding symposium, Jul. 11, 2007, Lisbon.

Tao, et al., "Orthogonal Bases Approach for the Decomposition of Mixed Pixels in Hyperspectral Imagery", IEEE Geoscience and Remote Sensing Letters, IEEE Service Center, NY, v. 6, n. 2, p. 219-223, (2009).

Gruninger et al., "The sequential maximum angle convex cone (SMACC) endmember models," SPIE, PO Box 10 Bellingham, Wa, Apr. 30, 2004.

Keshan, et al., "Spectral Unmixing", IEEE Signal Processing Magazine, vol. 19, 2002.

Gruninger et al., "The Extension of Endmember Extraction to Multispectral Scenes," Algorithms and Technologies for Multispectral, Hyperspectral, and Ultraspectrallmagery X. Edited by Shen, Sylvia S.; Lewis, Paul E. Proceedings of the SPIE, vol. 5425, pp. 15-30 (2004).

Kruse et al., "Extraction of compositional information for trafficability mapping from hyperspectral data"; SPIE International Symposium on AeroSense, v. 4049, pp. 262-273; Apr. 2000.

Schaum et al., "Spectral Subspace Matched Filtering," Algorithms for Multispectral, hyperspectral, and Ultraspectral Imagery, VII, Proc. Of SPIE, vol. 4381, 2001, pp. 1-17.

\* cited by examiner

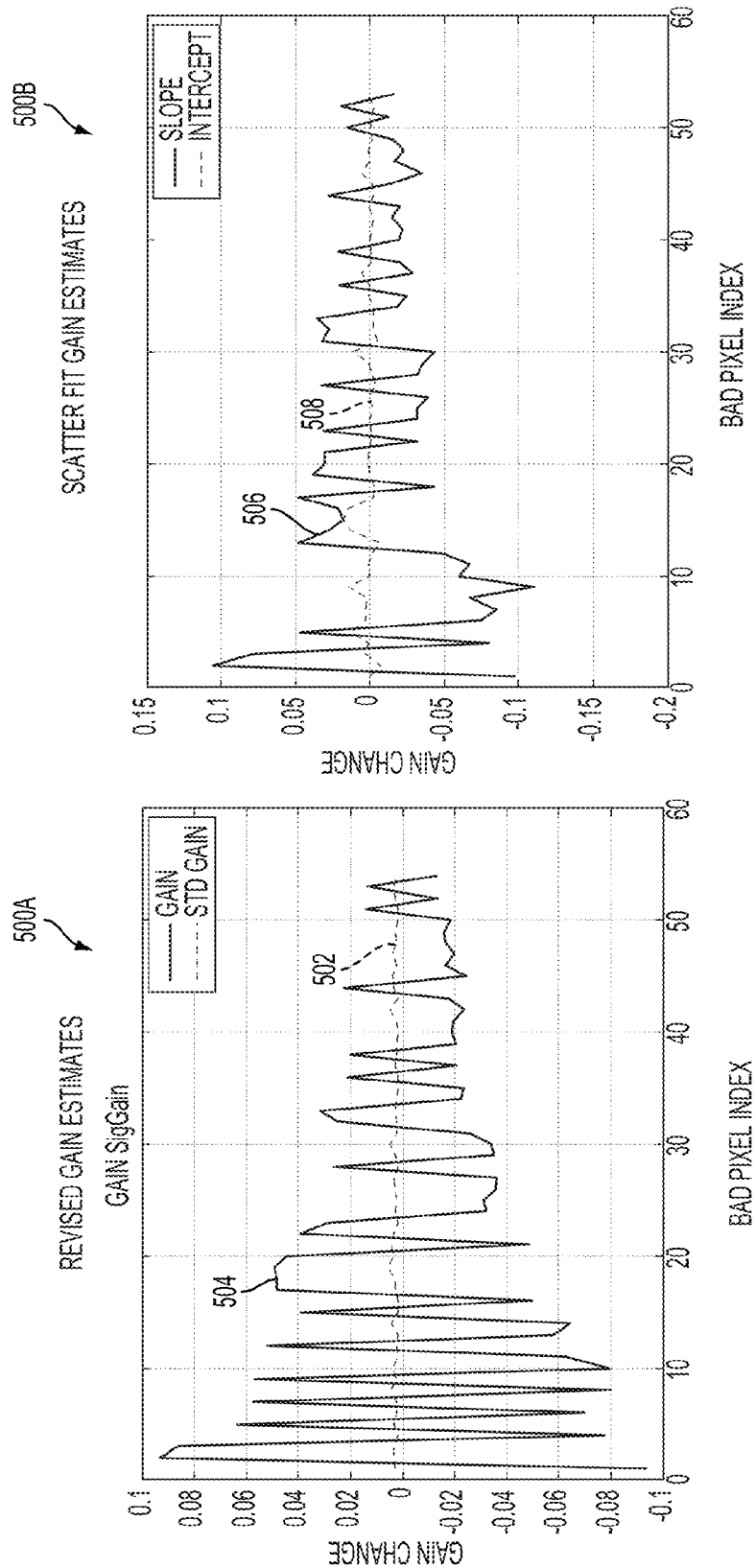

SYSTEM AND METHOD FOR RESIDUAL ANALYSIS OF IMAGES

CROSS REFERENCE TO RELATED APPLICATION

This application is related to U.S. application Ser. No. 13/085,883, filed Apr. 13, 2011, entitled "OPTIMIZED ORTHONORMAL SYSTEM AND METHOD FOR REDUCING DIMENSIONALITY OF HYPERSPECTRAL IMAGES," and to U.S. application Ser. No. 13/446,869, filed Apr. 13, 2012, entitled "SYSTEM AND METHOD FOR POST-DETECTION ARTIFACT REDUCTION AND REMOVAL FROM IMAGES," both incorporated by reference in their entireties herein.

BACKGROUND

This disclosure relates generally to the field of image processing, and more particularly to a system and a method for residual analysis of images.

In many conventional image processing scenarios comprising hyperspectral imaging (HSI) systems, hyperspectral sensors collect data of an image from one spatial line and disperse the spectrum across a perpendicular direction of the focal plane of the optics receiving the image. Thus a focal plane pixel measures the intensity of a given spot on the ground in a specific waveband. A complete HSI cube scene is formed by scanning this spatial line across the scene that is imaged. The complete HSI cube may be analyzed as a measurement of the spectrum, the intensity in many wavebands, for a spatial pixel. This spatial pixel represents a given spot on the ground in a cross-scan direction for one of the lines at a given time in the scan direction. These spectra are analyzed to detect targets or spectral anomalies. Some of the focal plane pixels may change in gain and/or offset since they were last calibrated. The offset and gain errors for such pixels result in measurement biases in the specific waveband and cross-scan location associated with that focal plane pixel. These biases will affect the values of target and anomaly filters and may also result in false alarms for target or spectral anomaly detection. Since every focal plane pixel is scanned across the scene, these poorly calibrated pixels will manifest themselves as stripes in the target and anomaly scores for the scene. These stripes can interfere with target or anomaly detection algorithms as well as data compression algorithms and limit mission performance. Accordingly, there is a need for on-platform scene based non-uniformity correction of pixels in an inexpensive and computationally fast manner.

SUMMARY

In accordance with an embodiment, a method for processing images includes receiving, at an image processor, an input datacube from which an input image is derived. The input datacube is transformed into a residual datacube by projecting out basis vectors from each spatial pixel in the input datacube, the residual datacube being used to derive a residual image. A statistical parameter value for samples of each focal plane pixel in the residual image is determined. Anomalous focal plane pixels are identified based upon a comparison of the determined statistical parameter value with the respective determined statistical parameter values of remaining focal plane pixels. Another comparison of residual values for each scanned sample of the identified anomalous focal plane pixels with values of corresponding scanned samples in the input datacube is performed. An estimation of at least one of a gain correction value and an offset correction value for the anomalous focal plane pixels is determined based upon the comparing. At the image processor, the input datacube is reconstructed based upon the estimation of at least one of the gain correction value and the offset correction value.

In accordance with an embodiment, an image processing system includes a memory having computer executable instructions thereupon. The image processing system includes an image processor coupled to the memory, the computer executable instructions when executed by the image processor cause the image processor to receive an input datacube from which an input image is derived. The input datacube is transformed into a residual datacube by projecting out one or more basis vectors from each spatial pixel in the input datacube, the residual datacube being used to derive a residual image. A statistical parameter value for samples of each focal plane pixel in the residual image is determined. Anomalous focal plane pixels are identified based upon a comparison of the determined statistical parameter value of each focal plane pixel in the residual image with the respective determined statistical parameter values of remaining focal plane pixels. Another comparison of residual values is performed for each scanned sample of the identified anomalous focal plane pixels with values of corresponding scanned samples in the input datacube. An estimation of at least one of a gain correction value and an offset correction value is determined for the anomalous focal plane pixels based upon the comparison. The input datacube is reconstructed based upon the estimation of at least one of the gain correction value and the offset correction value.

In accordance with an embodiment, a tangible computer-readable storage medium includes one or more computer-readable instructions thereon for processing images, which when executed by one or more processors cause the one or more processors to receive an input datacube from which an input image is derived. The input datacube is transformed into a residual datacube by projecting out one or more basis vectors from each spatial pixel in the input datacube, the residual datacube being used to derive a residual image. A statistical parameter value for samples of each focal plane pixel in the residual image is determined. Anomalous focal plane pixels are identified based upon a comparison of the determined statistical parameter value of each focal plane pixel in the residual image with the respective determined statistical parameter values of remaining focal plane pixels. Another comparison of residual values is performed for each scanned sample of the identified anomalous focal plane pixels with values of corresponding scanned samples in the input datacube. An estimation of at least one of a gain correction value and an offset correction value is determined for the anomalous focal plane pixels based upon the comparison. The input datacube is reconstructed based upon the estimation of at least one of the gain correction value and the offset correction value.

These and other features and characteristics, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various Figures. It is to be expressly understood, however, that the drawings are for the purpose of illustration and description only and are not intended as a definition of the limits of claims. As used in the

BRIEF DESCRIPTION OF THE DRAWINGS

FIG. 5A illustrates a plot for revised gain estimates of pixels, in accordance with an embodiment.

FIG. 5B illustrates a plot for scatter fit gain estimation of pixels, in accordance with an embodiment.

DETAILED DESCRIPTION

Figure 1:
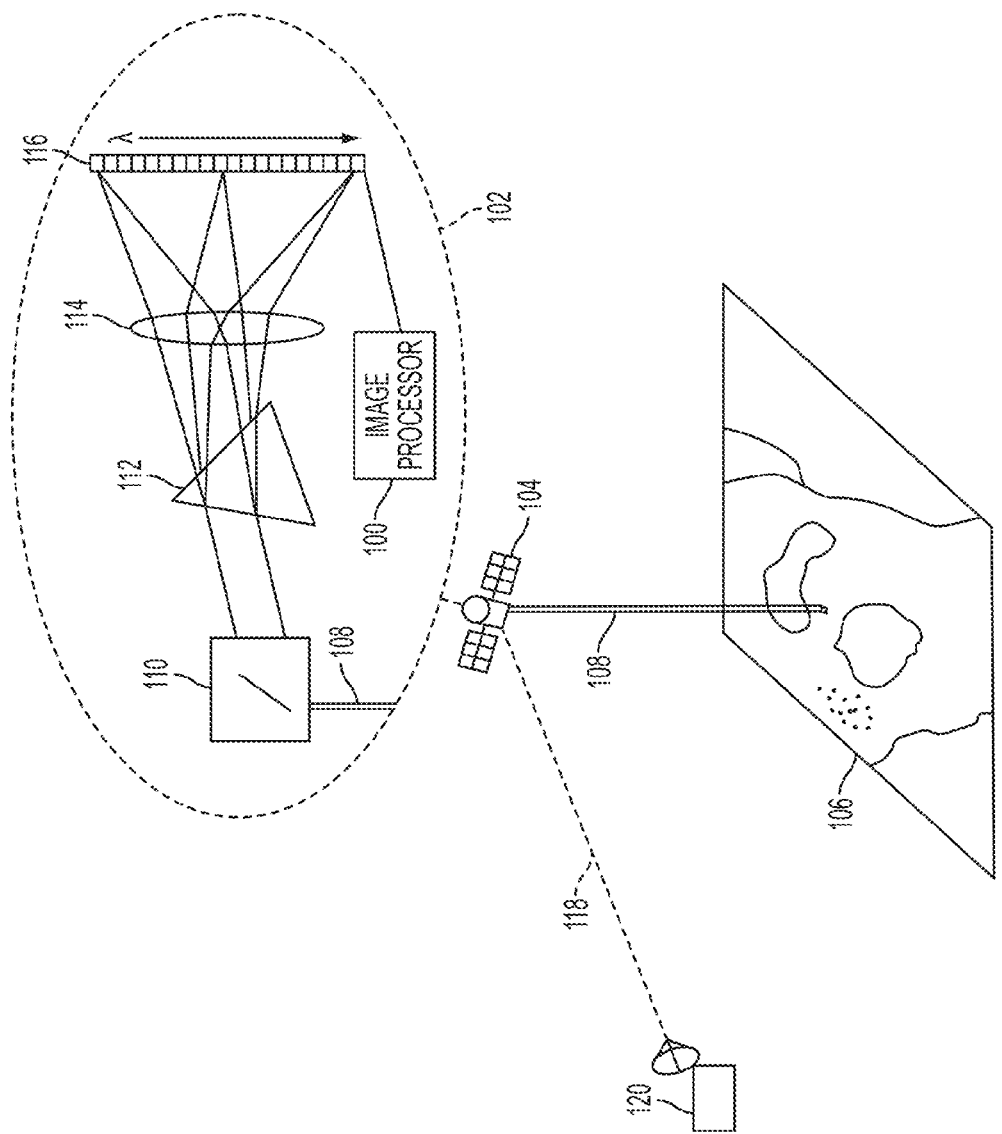
FIG. 1 illustrates an exemplary system for processing images, according to an embodiment.

In the description that follows, like components have been given the same reference numerals, regardless of whether they are shown in different embodiments. To illustrate an embodiment(s) of the present disclosure in a clear and concise manner, the drawings may not necessarily be to scale and certain features may be shown in somewhat schematic form. Features that are described and/or illustrated with respect to one embodiment may be used in the same way or in a similar way in one or more other embodiments and/or in combination with or instead of the features of the other embodiments.

Depicted in FIG. 1 is an embodiment of imaging system 102 that is configured to process images. By way of example only, imaging system 102 may be a hyperspectral imaging system. The term "hyperspectral" refers to imaging narrow spectral bands over a continuous spectral range, and produce the spectra of all pixels in a scene (e.g., scene 106). Imaging system 102 may be stationary or mobile, airborne or land based (e.g., on an elevated land structure or building), or may be on an aircraft or a satellite. As shown, imaging system 102 may incorporate image processor 100, and may be coupled to or otherwise contained within remote imaging system 104. Remote imaging system 104 may be of any suitable construction or configuration, including but not limited to comprising a satellite, an aerial surveillance system, or any other system that can capture images. Additionally, remote imaging system 104 may be stationary or mobile. In an embodiment, imaging system 102 and remote imaging system 104 may be configured to capture one or more images of a particular scene 106 corresponding to a geographical area (e.g., a ground terrain).

In an embodiment, remote imaging system 104 may be configured to use imaging system 102 to capture hyperspectral image(s) of scene 106 that are provided as input hyperspectral image (HSI) scenes to image processor 100. In an embodiment, hyperspectral imaging system 102 may include one or more scan mirrors 110, or may include other optics arranged to receive light 108 reflected from one or more ground resolution cells. Light 108 reflected from one or more ground resolution cells, and generally the entire scene 106, may be used by image processor 100 to determine an input reflectivity of input HSI scene. Input HSI scene may be a part of scene 106, or may be the entire scene 106 depending upon specific target detection goals. In an embodiment, scan mirrors 110 or the other optics may then direct light 108 through dispersing element 112, which may be arranged to separate light 108 into various different wavelengths (i.e., a spectra). After being separated into the various different wavelengths, light 108 may then be directed to one or more imaging optics 114, which may focus the various wavelengths onto a focal plane of detector array 116. As such, detector array 116 may capture hyperspectral data across the spectrum of wavelengths, thereby generating a data set corresponding to a hyperspectral image of scene 106. By way of example only, such a data set formed across the spectrum of wavelengths may be used to construct a hyperspectral image data cube (or, an HSI data cube), such as that described in the above-referenced U.S. application Ser. No. 13/446,869, incorporated by reference in its entirety herein. For example, the HSI data cube may be scanned and input to image processor 100. In an embodiment, the HSI datacube is a three dimensional (3D) data cube with each dimension corresponding to a data-set associated with the hyperspectral image of scene 106. The focal plane, which includes the line of detectors shown in 116, is composed of focal plane pixels, which specify a location in one cross-scan spatial dimension and one spectral band. For example, scanning of two-dimensional scene 106 over a spectrum of wavelengths by imaging system 102 creates an additional spatial dimension, resulting in the 3D HSI data cube. Any two of the three dimensions of the HSI data cube may be selected by image processor 100 to form a two dimensional image input to image processor 100 for processing, in accordance with various embodiments described herein. For example, spatial pixels may be defined as a spatial location in two-dimensional Cartesian co-ordinates. As a result, the 3-D HSI data cube comprises a spectrum for each spatial pixel and may be analyzed by image processor 100 as a set of spectra for the spatial pixels. Alternatively, the 3D HSI cube comprises a set of samples at different times along the scan direction for each focal plane pixel and may be analyzed by image processor 100 as a set of samples along the scan direction for each cross-scan spatial location and spectral waveband. As described herein, the term "sample" refers to a focal plane pixel, at a particular reflective wavelength ($\lambda$) and cross-scan location, at a specific time in the scan. Likewise, the term "samples" refers to the focal plane pixel at the particular reflective wavelength and cross-scan location at a set of different time instances, respectively.

Following the generation of the data set in the 3-D HSI data cube corresponding to the hyperspectral image of scene 106, image processor 100 may process the data set so as to reduce the dimensionality of the hyperspectral input scene image and/or decompose the input scene image into a compressed scene image and a hyperspectral residual image, as described in greater detail below. Using alternative terminology, the 3-D data cube may be decomposed into a compressed scene data cube and a residual scene data cube. Such decomposition may be performed by image processor 100, for example, by approximating the spectra of each spatial pixel in the 3-D HSI data cube, as a linear combination of basis vectors (BVs) having coefficients to best approximate the 3D HSI data cube and storing the errors in this approximation in the residual data cube. Such decomposition of the input scene spectra into BVs by the image processor 100 is described, for example, in the above-referenced U.S. application Ser. No. 13/085,883, incorporated by reference in its entirety herein. When the complete set of input scene spectra is considered, image processor 100 may decompose the input HSI data cube using BVs for the spectra of each spatial pixel in the data cube.

In one embodiment, the compressed scene image (or, compressed image) is a reduced dimensionality scene representation of the input hyperspectral scene image derived from input 3D HSI data cube, and obtained at detector array 116. In an embodiment, as described in greater detail below, the degree to which the dimensionality of the image is reduced in the compressed image and/or whether the dimensionality reduction is to be classified as lossy or lossless may be determined by adjustable features of imaging system 102. The hyperspectral residual image or data cube is comprised of the errors in each spectral waveband for each spatial pixel from the decomposition of the input hyperspectral scene image, and is substantially devoid of any content associated with scene 106, although in some embodiments, under less than ideal conditions, such as an inadequate BV set, some scene structure may leak into the residual image or the residual scene data cube. Artifacts, such as sensor artifacts or detector array 116 artifacts, manifest as stripes in residual image, as illustrated in various figures below. As such, after the decomposition of the input scene image (or input scene HSI data cube), in various embodiments, the residual image (or residual scene HSI data cube) may be processed to characterize sensor artifacts in the HSI data cube, detect scene structure leakage into the hyperspectral residual image from scene 106, or perform other analytics on the hyperspectral residual image.

In some embodiments, imaging system 102 may contain or otherwise provide a front end interface for one or more local processors (e.g., image processor 100) associated with remote imaging system 104. In some such embodiments, the one or more processors may be configured to analyze the residual image to estimate the non-uniformity correction of focal plane pixels in the hyperspectral image, and subsequently, apply the non-uniformity correction to focal plane pixels in the original hyperspectral image. Non-uniformity in pixels of the input scene image results from unequal response of each pixel to the same light 108. Further, such a response of each pixel may drift over time so the latest calibration of each pixel may be in error. In some embodiments, imaging system 102 may alternatively or additionally be configured to compress and locally store the hyperspectral image in a memory device (not shown), such that the reduced data set can be communicated rapidly within transmission 118 to remote station 120, which may be a ground station or other remote location where the data set can be further processed. For example, remote station 120 or other processing locations may analyze and process the decomposed image data set for the hyperspectral image without further decompression, after decompressing the reduced data set to produce the original data set, or any appropriate combination(s) thereof.

Figure 2:
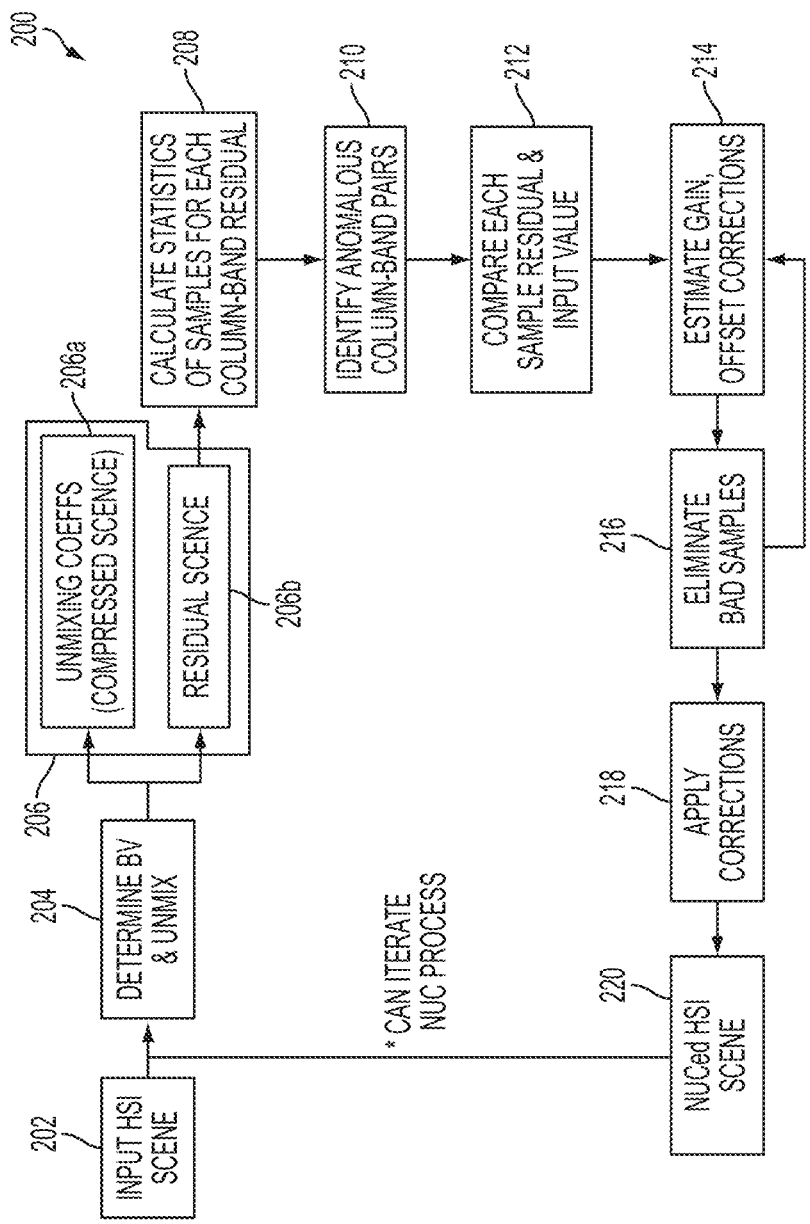
FIG. 2 illustrates an example flowchart of a method for processing images, in accordance with an embodiment.

FIG. 2 illustrates flow diagram for a method or process 200 for residual analysis of images for non-uniformity correction, in accordance with an embodiment. In one embodiment, the residual HSI image is extracted from an input HSI data cube. Accordingly, although the operations below are being described with respect to one or more residual or compressed images, the operations may be carried out on complete or whole data cubes having a plurality of such images. That is, instead of the terms "image," "images", "composite image," "composite images," "residual image," or "residual images," the terms "data cube," "data cubes," "composite data cube," "composite data cubes," "residual data cube," or "residual data cubes," respectively, may equally be used without departing from the scope of the embodiments described herein. Further, an image or images may be formed from extracting data of any two of the three dimensions that make up the data cube. For example, image processor 100 may carry out operations on the whole data cube, and as such, the hyperspectral image is actually a 3D image. It can be thought of as spectra for each 2D location or as many 2D scene images in different spectral bands. Some of the processing is done on the whole cube; some is done on images produced from the 3D HSI data cube. Processing done on the whole 3D HSI data cube may be in one dimension (1D) and may be applied to all samples in the other two dimensions, for example, for spectral processing of all the 2D spatial pixels or sample processing of all the 2D focal plane pixels. Image processing may be done on derivatives of the 3D HSI data cube such as the 2D image of the mean residual for each focal plane processing, for example, to identify spots in the image.

In an operation 202, image processor 100 receives one or more hyperspectral images (or, input data cubes) corresponding to an input HSI scene (obtained from scene 106 or a factory supplied image or data cube). In one embodiment, the input HSI scene may have a plurality of images or image frames obtained across various different wavelength bands (λ) at the focal plane of detector array 116. Alternatively, as also noted above, the whole 3-D HSI data cube may be received at image processor 100 for processing. The input scene image or the input HSI data cube associated with the input scene image may then be provided to image processor 100 for processing. Input scene image may include a plurality of pixels arranged according to a coordinate system (e.g., X-Y Cartesian coordinate system). By way of example only, such pixels may be focal plane pixels and/or spatial pixels, as defined above.

In an operation 204, basis vectors (BVs) associated with each spatial pixel in the input scene image are determined by image processor 100. Each BV used to describe the input scene image represents a spectrum, and the intensity at each wavelength, which is a component of each spatial pixel's spectrum. Image processor 100 determines coefficients associated with the BVs for each of the spatial pixels and unmixes the BV representation of the input scene image. The input HSI scene image can be approximately represented as a linear sum of coefficient weighted basis vectors; and the residual components are the error at each waveband for each spatial pixel in this approximation. In one embodiment, a small number of BVs may be used to characterize most of the input scene image. Such a process of determining BVs may include starting with a seed BV and establishing additional BVs to complete a set of BVs that represent the input scene image. The additional BVs may be used to remove scene structure from the residual datacube and residual images derived therefrom, thereby enabling use of additional residual samples for identification and correction of anomalous focal plane pixels. Scene structure may be defined as material in scene 106 with a spectrum that is different from the spectra of other things or items in scene 106. Unmixing of the BVs comprises carrying out a linear fit of vectors to approximate the input scene image. Details of determining BVs and unmixing them are provided in the above-referenced U.S. application Ser. No. 13/085,883, incorporated by reference herein, and will not be described, although other techniques of BV representation of images may be applied by image processor 100 to approximate input scene image leaving artifacts and noise in the residual scene.

In an operation 206, unmixing BVs from every pixel, yields the compressed scene image 206a having unmixed BV coefficients, and residual image 206b. When complete data cubes are processed by image processor 100, a residual HSI data cube (or, residual scene data cube) may be obtained by projecting out one or more basis vectors from every spatial pixel in the input HSI data cube. Ideally, residual image 206b or the residual data cube has no scene structure, because the scene structure is contained in the reduced dimensionality scene image 206a. The error spectra of unmixed BVs form residual image 206b, which may contain sensor artifacts with very little scene content. As the common elements of scene 106, and therefore, input scene image at detector array 116, are extracted into compressed scene image 206a, various artifacts (e.g., sensor artifacts) are exposed as stripes in residual image 206b. The process of unmixing the input scene image or input HSI data cube into compressed scene image 206a (or, compressed scene data cube) and residual image 206b (or, residual scene data cube) is referred to herein by terms "decomposition," "decomposing," "transformation," or "transforming" of input scene image or input HSI data cube. The flow then proceeds to operations 206-216 that are performed upon residual image 206b by image processor 100.

In operation 208, image processor 100 determines statistical characteristics of all samples of the residual for each focal plane pixel in residual image 206b. For example, image processor 100 may calculate such statistical characteristics by calculating one or more statistical parameter values such as an average, a mean, a median, a standard deviation, or combinations thereof (e.g., mean minus a threshold value, etc.), of the samples for each focal plane pixel in residual image 206b or residual HSI data cube from which residual image 206b is derived. Each focal plane pixel in residual image 206b may be uniquely denoted or identified by as a column-band pair. The column corresponds to the focal plane pixel's cross-scan spatial location and the band corresponds to the focal plane pixel's spectral wavelength. The samples of focal plane pixels are generated at each time as the sensor is scanned across scene 106. In one embodiment, average residual spectra for only a column of pixels may be determined, which would be the mean or median value of the error samples at each wavelength for the specified column. A numerical value of the average residual spectra may be stored in a memory device (not shown) coupled to or included in image processor 100.

Figure 3:
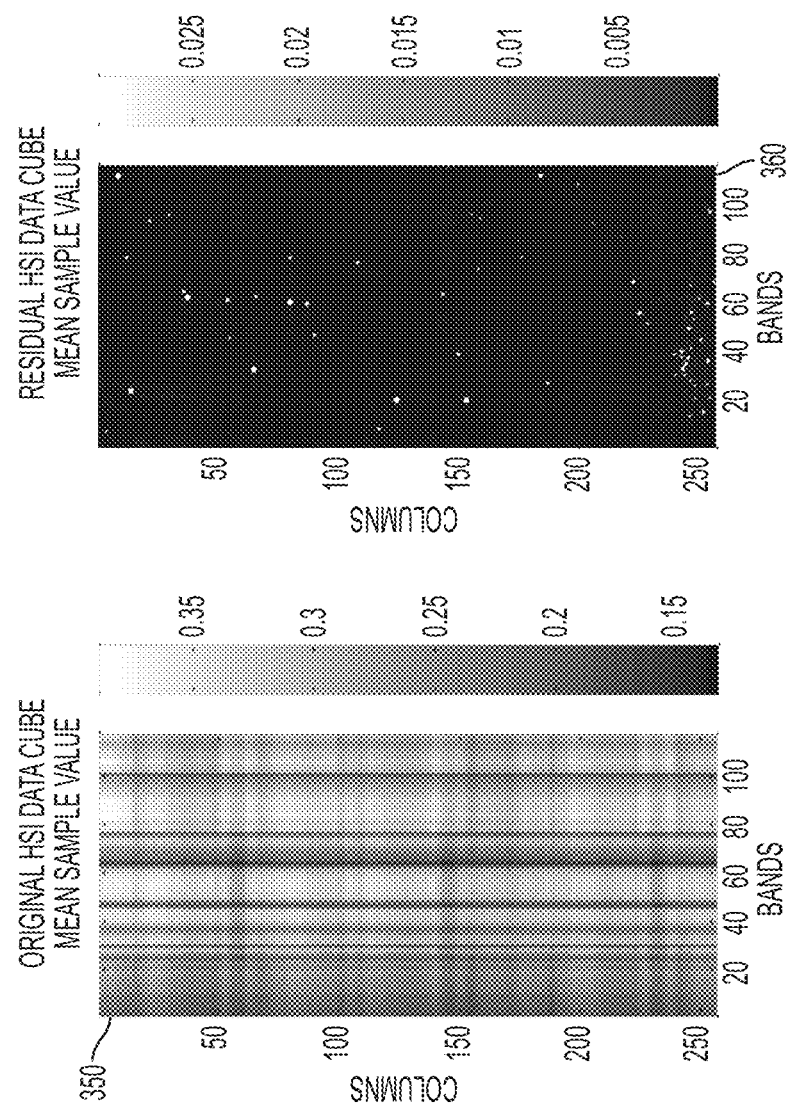
FIG. 3 illustrates identifying focal plane pixels with anomalous residual statistics, indicating potential calibration errors, in accordance with an embodiment.

Referring to FIG. 3, image 360 shows a mean sample error value for each focal plane pixel. It is apparent that a few bright spots in image 360 have much larger mean errors than the bulk of the focal plane pixels. These bright spots are identified as anomalous pixels. For comparison, the mean sample values of the original data are shown in image 350. Here the gray-scale image is dominated by the average spectra of the scene and the variation of the scene across the columns. This comparison demonstrates an exemplary advantage of decomposing the HSI cube into the compressed cube and the residual error cube to separate the scene content from the sensor artifacts.

In operation 210, image processor 100 identifies anomalous column-band pairs corresponding to anomalous focal plane pixels based upon the statistical characterization of the residual error samples of each focal plane pixel (calculated in operation 208) when compared with the residual error statistics of the other or remaining focal plane pixels. For example, image processor 100 determines how far a mean residual error value of a particular pixel is from the computed average value of the mean residual error for all pixels. If the residual error value for that pixel is within a predetermined distance of the average residual error value, then image processor 100 skips that pixel (or, does not modify that pixel). If not, image processor 100 marks that pixel as an anomalous pixel and stores the corresponding column-band pair value in a memory device (not shown) coupled to image processor 100. Therefore, by virtue of the unique column-band pair value, anomalous pixels are identified. For example, some of the bright pixels in image 360 may be above a threshold distribution of an average or other statistical parameter value, and may be marked as anomalous. In yet another example, anomalous focal plane pixels are identified by image processor 100 based on an unusually large standard deviation of the residual error samples comprising the standard deviation residual image or using both mean residual image and standard deviation residual image. In one embodiment, a combination of thresholding techniques may be used. The flow then proceeds to operation 212.

In operation 212, image processor 100 compares the residual error value of each sample of each identified pixel in operation 210 with the value of the corresponding sample of the corresponding pixel in the original input scene image received in operation 202. Such comparison is used in determining if the pixel error values for the anomalous pixels can be explained by a recalibration of the pixel, or if the pixel should be flagged as a bad pixel for potential elimination from future processing, as discussed in the operations 214 and 216 below.

In operation 214, based upon the comparison of the residual error samples for each anomalous pixel in residual image 206b with their original values in the input scene image received in operation 202 by image processor 100, image processor 100 determines one or more estimations of gain and offset correction values for each anomalous pixel. In one embodiment, image processor 100 may include samples of anomalous focal plane pixels to estimate the gain and offset correction values. Gain and offset correction values may be determined by image processor 100 by generating scatter plots shown in FIGS. 4A and 4B discussed below. In one embodiment, when the offset is accurately known only gain correction may be applied, as discussed in FIG. 4B below. For example, when a dark frame offset measurement is made prior to each HSI scene frame, the offset of each pixel is accurately determined, and the offset correction can be set to zero. For example, dark frame measurements corresponding to zero input scene with only noise input may be used by image processor 100 to determine the offset.

Figure 4A:
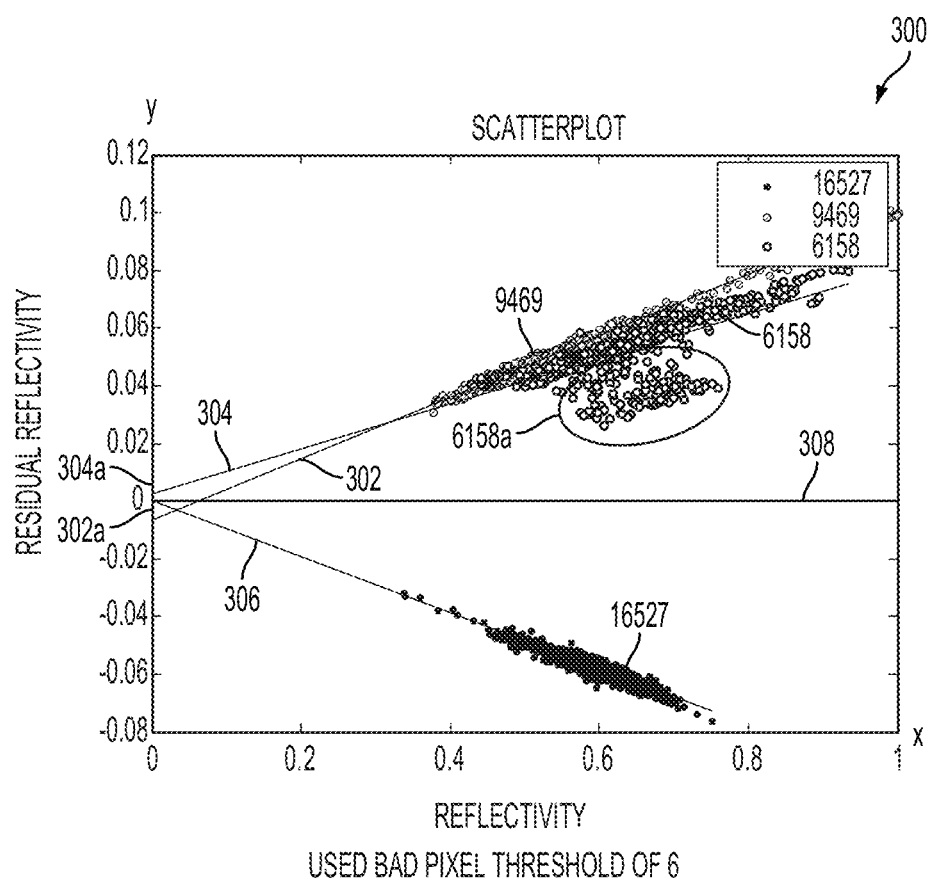
FIG. 4A illustrates a scatter plot for determining gain and offset corrections for pixels and identifying outlier pixels, in accordance with an embodiment.

Referring now to FIG. 4A, scatter plot 300 illustrates column-band pairs identified by example pixels 6158, 9469, and 16527 which have been identified as anomalous in residual image 206b, although other number of example pixels may be used. By way of example only, multiple samples shown for each pixel 6158, 9469, and 16527 illustrate the correlation in the respective pixel's residual reflectivity values and the original reflectivity values. In one example, a linear correlation is the result of gain and offset errors in the pixel calibration. The gain and offsets are determined for each focal plane pixel during calibration. The calibrated measurement, c, is determined from the raw measurement, r, by the following equation (1):

$$c = \text{gain} * r + \text{offset} \quad (1)$$

A gain error results in an error in c, which increases in magnitude proportionately to the original data reflectivity (e.g., positive slope for samples of pixels 9469 and 6158, and negative for samples of pixel 16527). The gain error could be positive or negative, resulting in a correlation line of positive or negative slope, respectively. An offset error would yield errors in c that are independent of the original data reflectivity. Since a gain error has no effect on a signal of zero, the value of the y-intercept is the offset error. For example, for pixel 6158, such multiple sample points of each pixel may lie along a curve 302 plotted on scatter plot 300 with a reflectivity of residual image 206*b* as a function of reflectivity of the input scene image received by image processor 100 in operation 202. In one embodiment, curve 302 may be a straight line intersecting the Y-axis at an offset 302*a* calculated as a distance from origin of scatter plot 300, although other types of linear or non-linear curves may be fitted over pixel 6158. Curve 302 has a slope that is used by image processor 100 to calculate a gain error in the calibration of pixel 6158. For example, in one embodiment, the slope of curve 6158 is directly proportional to the gain error associated with pixel 6158. Gain error may be calculated by change in residual reflectivity divided by a change in input scene image reflectivity (or, $\Delta y/\Delta x$). As discussed above, the gain error derived from the residual values of pixel 6158 indicates a change in the calibration gain of pixel 6158. As illustrated in scatter plot 300, curve 302 associated with pixel 6158 has a slight negative offset error 302*a*. The small offset for this specific example confirms the accuracy of this technique, since the offset used on this original data was recalibrated immediately prior to the data collection by a series of dark frame measurements. This procedure therefore provides accurate offset calibrations. Similarly, multiple points corresponding to gain errors of pixel 9469 lie along curve 304 and for pixel 16527 lie along curve 306. Pixel 9469 has an offset 304*a* whereas pixel 16527 has a zero offset. The offsets for all of these pixels are small. From scatter plot 300, in operation 214, image processor 100 may estimate gain and offset corrections for each pixel in the input scene image or input scene data cube received in operation 202. For example, gain correction may be determined based upon a comparison of curves 302, 304, and 306 with ideal gain curve 308 passing through origin and parallel to the X-axis (having a zero slope). In one embodiment, such gain and offset corrections may be carried out for columns and bands with anomalous residuals, for a plurality of samples of the band such that the residual values are compared with the original intensity values in the input scene image received by image processor in operation 202.

In addition or alternatively, scatter plot 300 may be used to identify and/or eliminate outlier samples. For example, pixel points 6158*a* in scatter plot 300 are poor fits to curve 302. One reason for such outliers is imperfect compression of the original input HSI datacube, so that some scene structure remains in some samples of the residual error as the pixel is scanned across scene 106. Accordingly, such outlier samples may corrupt the estimation of gain and offset errors. In one embodiment, scatter plot 300 is fitted for focal plane pixel samples such that the outlier samples are not included in the fit. Scatter plot 300 may also show that the residuals are not correlated to the original data in accordance with these error models. This result would indicate that the pixel has some other error, not a simple gain and offset change, and could be labeled as a bad pixel to be eliminated by image processor 100.

Figure 4B:
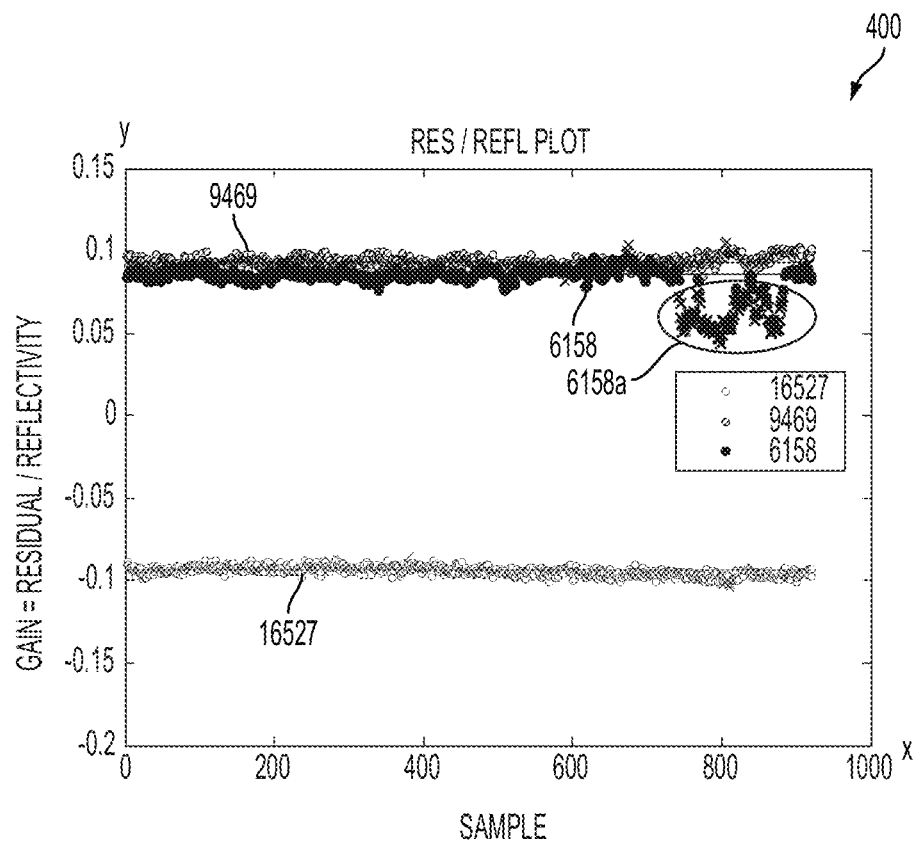
FIG. 4B illustrates a plot for determining gain corrections for pixels, when the offset is zero, and for identifying outlier pixels, in accordance with an embodiment.

Referring to FIG. 4B, plot 400 illustrates value of gain for each sample of pixels 6158, 9469, and 16527, assuming that the offset is zero, calculated using equation (2):

$$\text{gain\_sample} = \frac{c}{r} \quad (2)$$

This approach may be valid when the offset term is accurately known, as when dark frame measurements are used to measure the offset prior to the HSI data cube measurement. With confidence that offsets are small or even zero for one or more pixels, and the non-uniformity correctable by image processor 100 is a change in gain, and image processor 100 can improve the gain estimate by using plot 400. By plotting the gain (assuming offset=0) for each sample, image processor 100 may identify outliers (shown by points 6158*a*) and average the remaining samples with compatible gain estimates. Outlier points 6158*a* are seen to occur in contiguous samples, which may result from localized scene structure imperfectly approximated in the basis vector decomposition of the HSI data cube. In one embodiment, outliers may be identified by calculating a mean and a variance ($\sigma$), removing outliers, and iterating. It is to be noted that since curves 302, 304, and 306 of scatter plot 300 have a constant slope, in plot 400, pixels 6158, 9469, and 16527 lie along a straight line having a zero slope.

Referring to FIGS. 5A and 5B, plots 500A and 500B summarize exemplary results of using an image processor 100 to determine or calculate gain and offset error estimates for the worst pixels (e.g., pixels that have the highest residual error values in residual image 206*b* or residual scene HSI data cube). For example plot 500A illustrates the gain error estimates, in curve 504, and the standard deviation of gain error estimates, in curve 502, resulting from an analysis of plot 400. The standard deviation is a measure of the uncertainty of the estimate. The low values of standard deviation show that the gain error estimates in curve 504 are accurate. Similarly, plot 500B illustrates gain error estimates (slope in curve 506) and offset error estimates (intercept in curve 508) resulting from an analysis of plot 300. In both plots, the gain errors are plotted as a function of bad or anomalous pixel index, which results from sorting the anomalous focal plane pixels based on the residual error statistic (e.g., mean, median, etc.) used originally to identify the pixels for analysis by plot 400 or 300 respectively. The gain and offset error estimates are used by image processor 100 to calculate respective gain and offset correction values.

Referring back to FIG. 2, in operation 216, image processor 100 eliminates the outlier samples that do not lie on the scatter plots 300 and/or 400, as described above. Such outlier samples are removed from the fitting process as discussed above (e.g., pixels associated with pixel points 6158*a*) to avoid corrupting the gain error and offset error estimates. In one embodiment, operations 214 and 216 may be performed iteratively or multiple times for refining estimates of gain and offset corrections (as indicated by a connecting feedback arrow), and for refining the identification of outlier samples.

In operation 218, for anomalous pixels, whose errors are well characterized by the gain and offset error model, image processor 100 applies gain and offset corrections calculated based upon scatter plot 300 and/or plot 400 to such anomalous pixels in the original HSI scene 202. The new corrected data value c' for each pixel is determined by the following equation (3):

$$c' = (1 - \text{gain\_error}) * c - \text{offset\_error} \quad (3)$$

In operation 220, a reconstructed non-uniformity corrected HSI input scene image (or, input scene HSI data cube) is created by image processor 100 based upon the results of operations 210-218. The acronym "NUCed" stands for "nonuniformity corrected." Such a reconstructed input scene image (or, input scene HSI data cube) may be used for target detection by remote station 120 or by imaging system 102. The reconstructed scene image may itself be used by image processor 100 to carry out operations 204-218 again in a recursive manner to further refine the determination and correction of gain and offset errors (and hence, the corresponding gain and offset correction values).

Figure 6:
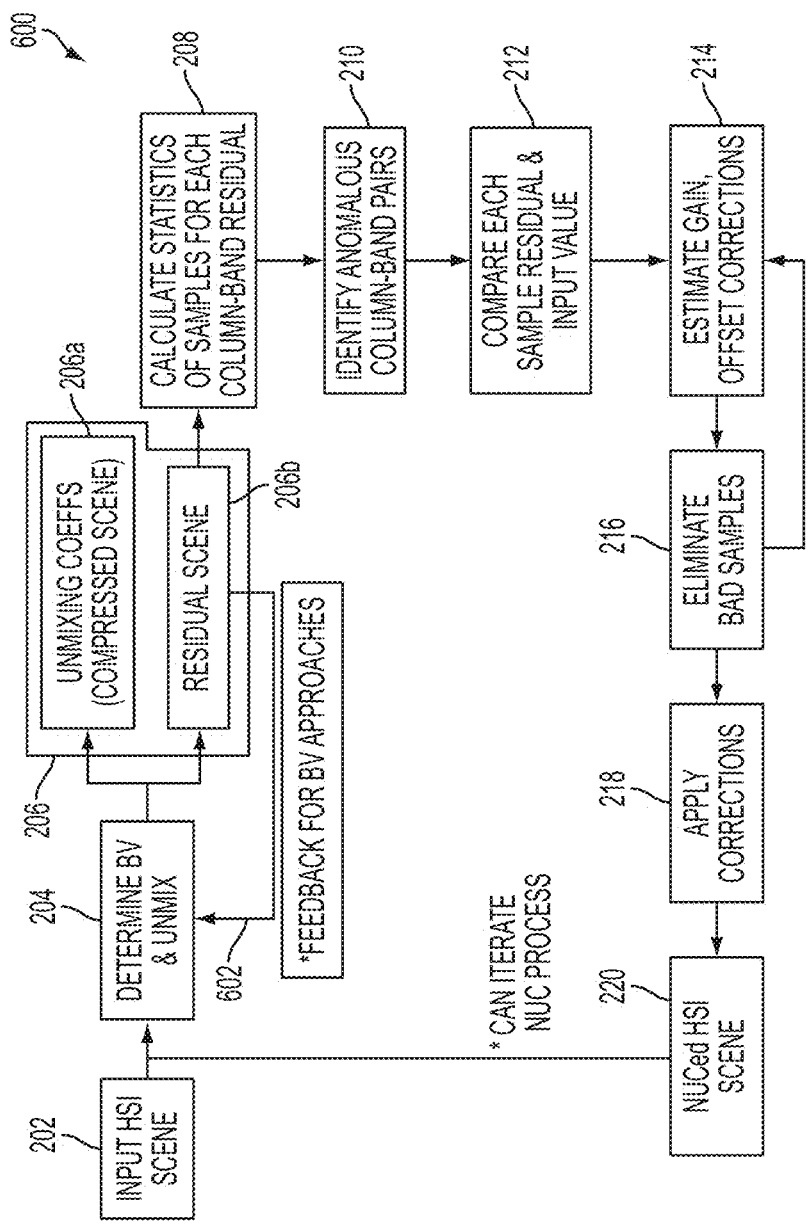
FIG. 6 illustrates an example flowchart of a method for processing images, in accordance with an embodiment.

FIG. 6 illustrates an embodiment where the flow diagram of method or process 200 is modified into a flow diagram of method or process 600. Operations in method 600 are similar to operations 202-220 of method 200 except that operation 204 of determining and unmixing BVs may be applied to residual image 206b itself, in addition to applying operation 204 to the input HSI scene image only. By way of example only, such feedback of pixels of residual image 206b, shown by path or feedback loop 602, causes further refinement of residual image 206b prior to application of operations 208-220 on residual image 206b. An advantage of applying operation 204 to residual image 206b iteratively is that residual image 206b has a lesser amount of input HSI scene leakage, relative to when there is no feedback or iterative unmixing of BVs to residual image 206b or residual scene data cube. An example advantage of such feedback loop 602 is to provide an improved non-uniformity correction rather than to controlling the basis vectors solely based on the adequacy of the compressed data.

Figure 7:
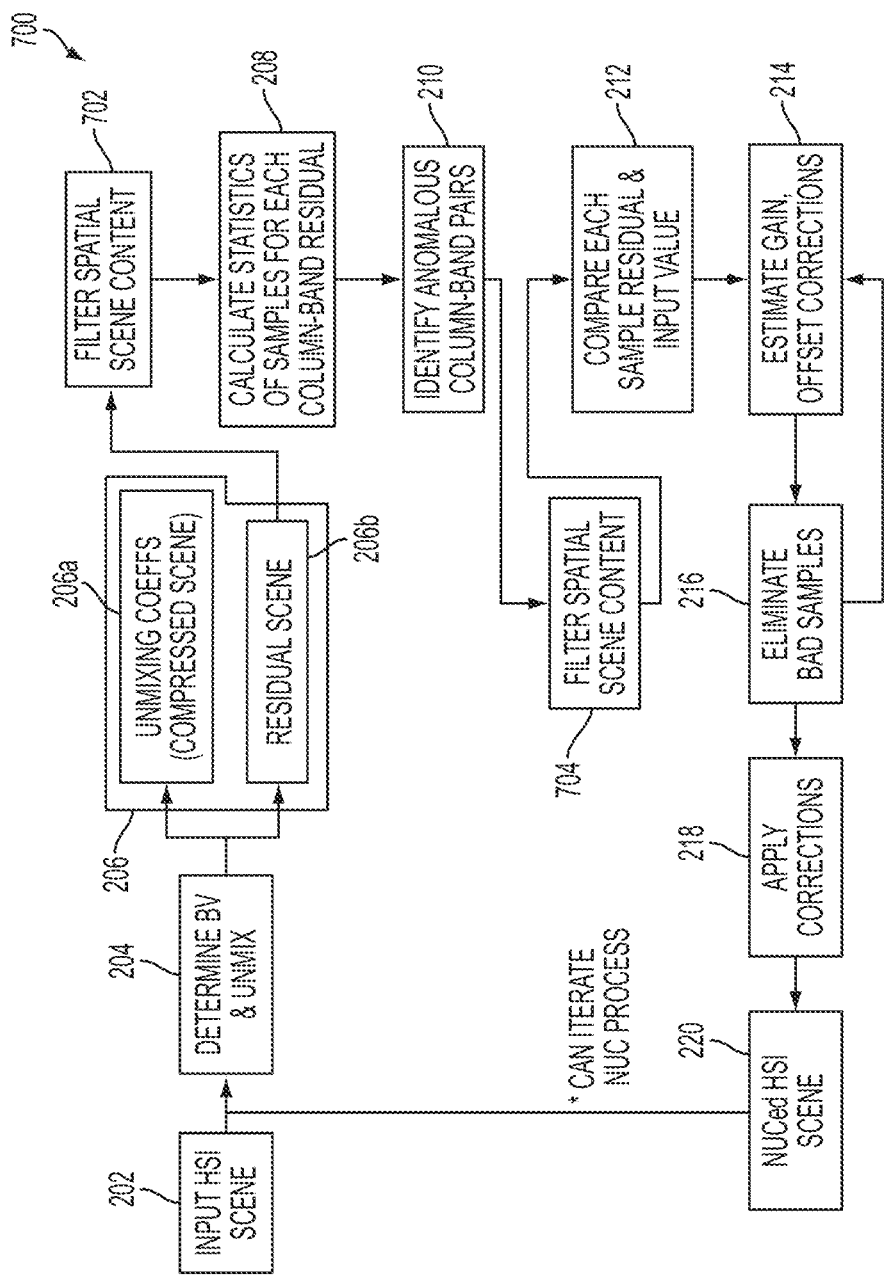
FIG. 7 illustrates an example flowchart of a method for processing images, in accordance with an embodiment.

FIG. 7 illustrates an embodiment where the flow diagram or method or process 200 is modified to a flow diagram of method or process 700. In method 700, operations 702 and 704 are added to operations 202-220 of method 200. The additional operations identify scene content that has leaked into the residual cube, but rather than remove it by unmixing additional basis vectors, as in FIG. 6, the scene content is filtered from the samples used in calculating the focal plane pixel statistics, in operation 208, and filtered from the scatterplots analyzed in operation 212. The scene content leakage consists of spatial patterns in the residual cube due to a non-ideal decomposition of the original data into a compressed scene and residual cube.

In operation 702, residual image 206b from operation 206 is filtered by one or more filters (not shown) implemented or configured by image processor 100 for spatial scene content or scene structure present in residual image 206b. Identification of such leakage of scene content or structure into residual image 206b (or, residual HSI data cube) comprises identifying one or more spatial pixels whose residual spectrum contains scene structure, not just noise and sensor artifacts. These spectra result in one or more samples with scene contamination in the corresponding focal plane pixels. These samples may be identified as poor samples of the focal plane pixels to use in estimating calibration changes, because the additional scene content will cause these samples to be poor fits to the gain/offset error model. In one embodiment, the spatial samples of the residual datacube identified as containing scene structure are eliminated from the residual HSI datacube prior to the determining the average, mean, median, standard deviation, or other statistical parameter value of the spatial samples of residual values for the focal plane pixels, in operation 208, and/or prior to the comparing the samples of the residual for the identified anomalous focal plane pixels with the values of corresponding focal plane pixels in the input data cube, in operation 212. In other embodiments, these poor samples are not eliminated from the residual image 206b or residual HSI datacube, but they are flagged to be ignored in determining the mean, median, or standard deviation of the spatial samples of residual values for the focal plane pixels, in operation 208, and in comparing the samples of the residual for the identified anomalous focal plane pixels with the values of corresponding focal plane pixels in the input data cube, in operation 212. Filtering may be carried out by image processor 100 using digital filters implemented in hardware, using filtering programs or code residing in a memory of image processor 100, or combinations thereof.

In operation 704, after anomalous column-band pairs have been identified in operation 210, the samples of these identified column-band pairs are spatially filtered again, similar to operation 702. This filtering consists of removing the poor samples from the scatterplots 400 and 500 as identified in operation 702.

Figure 8:
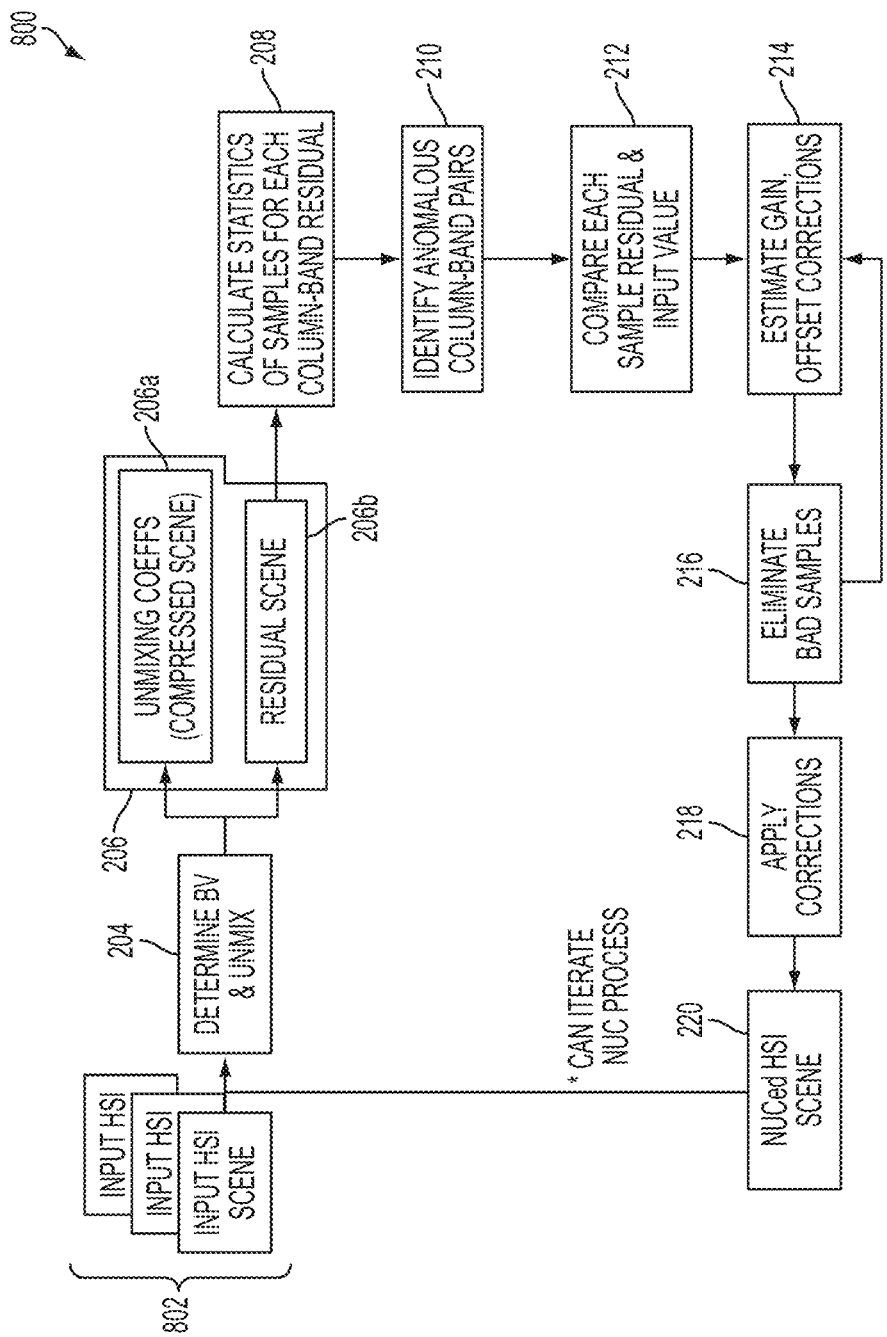
FIG. 8 illustrates an example flowchart of a method for processing images, in accordance with an embodiment.

FIG. 8 illustrates an embodiment where flow diagram 200 is modified to flow diagram 800. Flow diagram 800 illustrates multiple input HSI scene images (or, frames) are received in operation 802, which replaces operation 202 of FIG. 2. In operation 802, such multiple input HSI scene images are provided sequentially or in parallel to image processor 100 that subsequently performs operations 204-220 according to flow diagram 200 discussed above. In an embodiment, the gain and offset corrections can be calculated only once for the first scene, and the same corrections can be applied to several subsequent input scenes. Since the gain and offset corrections may be slowly changing, this process allows more rapid non-uniformity correction. In another embodiment, multiple HSI scenes can be processed simultaneously as one large input HSI data cube. This process provides more samples for the gain and offset correction estimates and may give a more accurate correction that would be applied to all the HSI scenes processed simultaneously.

In one embodiment, the operations 202-220, 702, 704, and 802, and other combination of processes described in operations in flow diagrams for methods 200, 600, 700, and 800, respectively above, may be iterated or repeated more than once to obtain a higher quality of residual images and detection and elimination of anomalous pixels.

Figure 9:
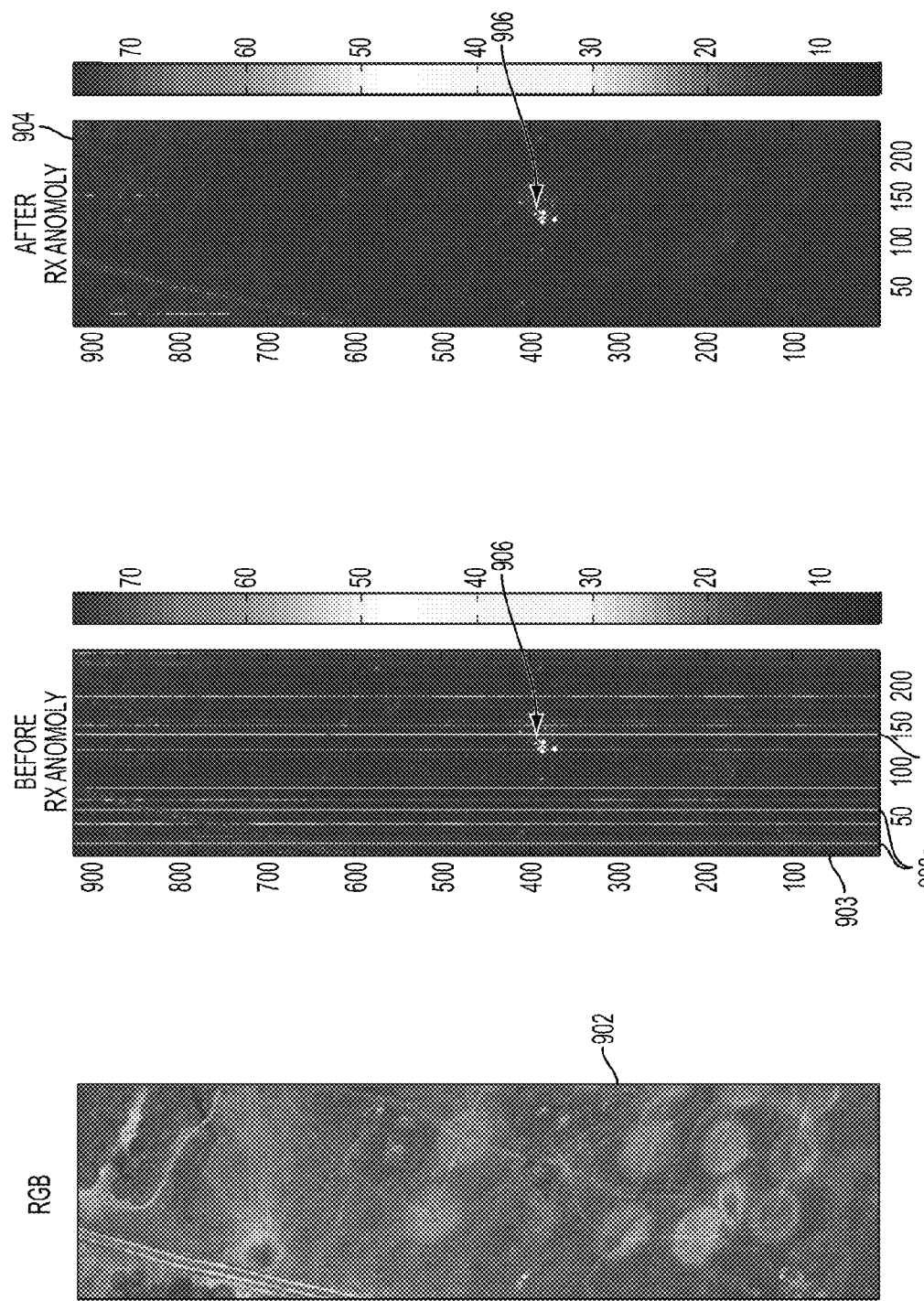
FIG. 9 illustrates an improvement in an anomaly filter image after processing an original input image with modified gains, in accordance with an embodiment.

FIG. 9 illustrates exemplary benefits and effectiveness of the non-uniformity correction process. Example input scene image 902 is generated from an RGB composite image of a red (R), green (G), and blue (B) band of the input HSI scene 202. Image 903 is obtained by running a Reed-Xialoi (RX) anomaly detector on the original HSI scene 202, although other types of anomaly detectors known to one of ordinary skill in the art could be used. Image 904 is obtained by running a Reed-Xialoi (RX) anomaly detector on the NUCed HSI scene 220 after processing by image processor 100. By way of example only, input scene image 902 may be obtained from data obtained during a set of test flights over a terrain (e.g., scene 106). In RX image 903, pixel calibration errors result in the numerous bright stripes 903a that obscure most of the scene anomalies that may be seen quite easily in RX 904. After processing of the NUCed scene 220, the RX image 904 contains much less striping and clearly shows potential target 906.

Figure 10:
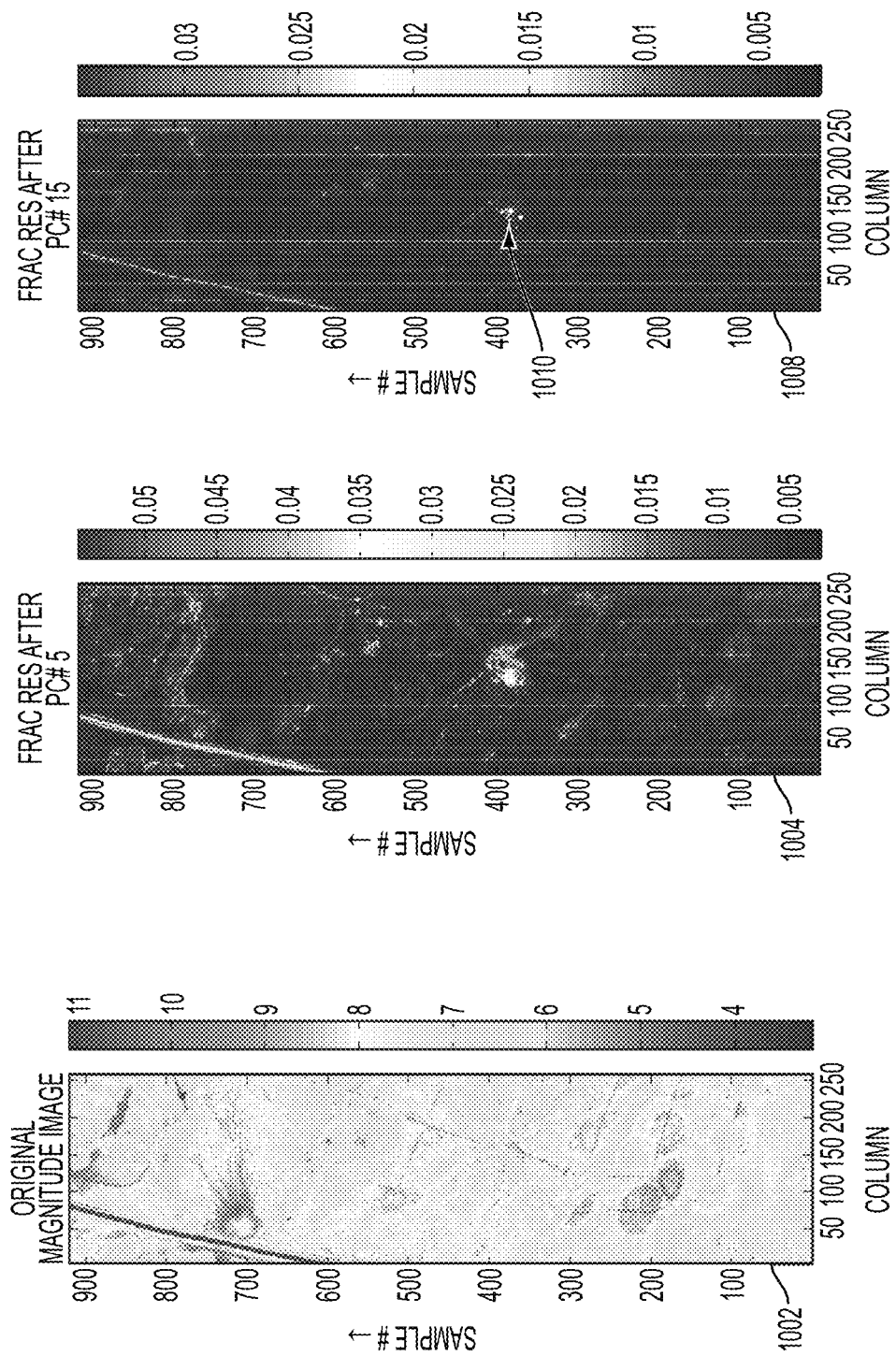
FIG. 10 illustrates striping of the residual image after processing an original magnitude input image to unmix the most important basis vectors, in accordance with an embodiment.

FIG. 10 illustrates the removal of scene content from the residual scene as additional basis vectors are unmixed and the consequent appearance of striping as gain and offset errors become more prominent. The original magnitude image 1002 is similar to input HSI scene displayed in the RGB image 902. Original magnitude image 1002 shows the magnitude of original spectra for each spatial pixel. The magnitude is the root mean square sum of each of the spectral components, although other magnitude values may be used (e.g., normalized or absolute magnitude). Image 1004 is an example of the fractional residual magnitude after five basis vectors have been unmixed. The fractional residual magnitude is the root mean square sum of each of the residual spectra, from 206*b*, divided by the original magnitude 1002. Image 1008 is an example of the fractional residual magnitude after fifteen basis vectors have been unmixed. It is to be noted that the majority of image 1008 is a more uniform black color, much of the bright scene structure apparent in image 1004 is no longer apparent. The more prominent feature in image 1008 are the stripes indicating that one or more bands in that column have large residual errors that may be caused by gain and/or offset errors. Bright white spot 1010 remaining in the center of image 1008 is an example of scene structure leakage into the residual error cube. This bright spot 1010 would be used in operation 602 of FIG. 6 to generate a basis vector that would remove the white spot from the residual error image 206*b* (or, residual HSI data cube) and incorporate the spot in the compressed data cube 206*a*. In another embodiment, bright spot 1010 would be filtered by process 702, so those samples (approximately #380-400) would not be used in evaluating the statistics of the residual spectra in operation 208 for any bands of the striped column (approximately #140). Bright spot 1010 would also be filtered by process 704, so those samples (approximately #380-400) would not be used in analyzing the scatterplots in operation 212 for any bands of the striped column (approximately #140). In another embodiment, this bright spot 1010 would be expected to result in outlier samples, such as 6158*a*, in scatterplots in operation 212.

Figure 11:
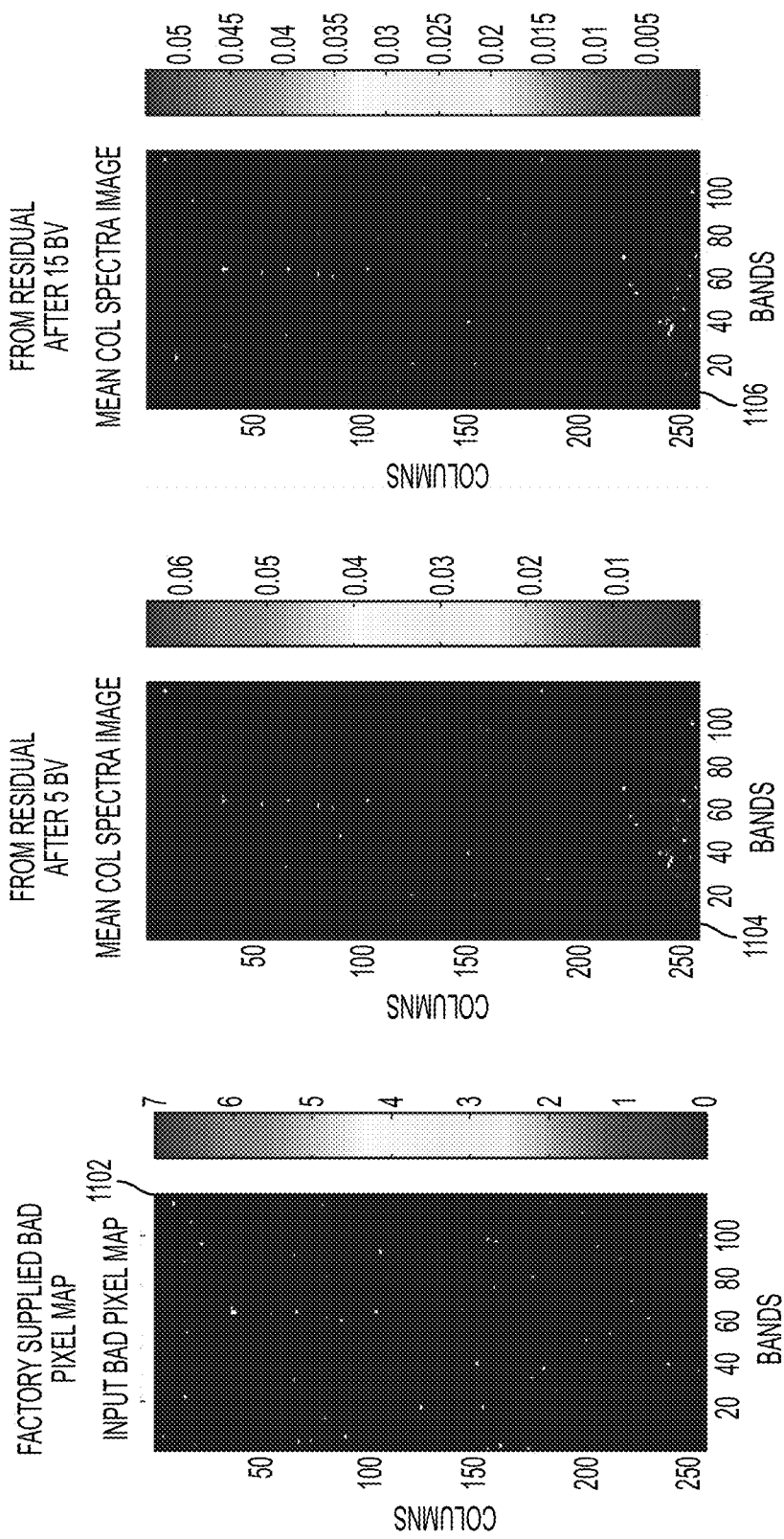
FIG. 11 illustrates a comparison of the supplied factory bad pixel map image with images of the pixels selected for gain/offset modifications, in accordance with an embodiment.

FIG. 11 illustrates a comparison of the anomalous focal plane pixels identified by processes 208 and 210 with a bad pixel map supplied by the sensor calibration process 1102. Examples of the mean residual error are shown in image 1104 and 1106 after unmixing five and fifteen BVs respectively. The bright spots in 1104 and 1106 are the anomalous focal plane pixels, those with large residual errors. There is a high correlation between these bright spots and the calibration produced bad pixel map 1102. However, the characteristics of the scatterplots shown in FIGS. 4A-4B and plots in FIGS. 5A-5B, and the quality of improvement shown in FIG. 9, show that many of these bad pixels are correctable by the process described in FIG. 2.

The above-described systems and methods can be implemented in digital electronic circuitry, in computer hardware, firmware, and/or software, e.g., in imaging system 102. The implementation can be as a computer program product (i.e., a computer program tangibly embodied in an information carrier medium). The implementation can, for example, be in a machine-readable storage device for execution by, or to control the operation of, data processing apparatus. The implementation can, for example, be a programmable processor, a computer, and/or multiple computers.

In one embodiment, a computer program can be written in any form of programming language, including compiled and/or interpreted languages, and the computer program can be deployed in any form, including as a stand-alone program or as a subroutine, element, and/or other unit in image processor 100 suitable for use in a computing environment to carry out the features and functions of various embodiments discussed herein. A computer program can be deployed to be executed on one computer or on multiple computers at one site (e.g., in imaging system 102).

Method steps or operations can be performed as processes by one or more programmable processors executing a computer program to perform functions of various embodiments by operating on input data and generating output. Method steps can also be performed by and an apparatus can be implemented as special purpose logic circuitry. The circuitry can, for example, be a field programmable gate array (FPGA) and/or an application specific integrated circuit (ASIC). Modules, subroutines, and software agents can refer to portions of the computer program, the processor, the special circuitry, software, and/or hardware that implements that functionality.

Image processor 100 may comprise one or more processors suitable for the execution of a computer program include, by way of example, both general and special purpose microprocessors, and any one or more processors of any kind of digital computer. Generally, a processor receives instructions and data from a read-only memory or a random access memory or both. The elements of a computer may comprise a processor for executing instructions and one or more memory devices for storing instructions and data. Generally, a computer can include, can be operatively coupled to receive data from and/or transfer data to one or more mass storage devices (e.g., a memory module) for storing data (e.g., magnetic, magneto-optical disks, or optical disks). The memory may be a tangible non-transitory computer-readable storage medium having computer-readable instructions stored therein for processing images, which when executed by one or more processors (e.g., image processor 100) cause the one or more processors to carry out or implement the features and functionalities of various embodiments discussed herein.

Data transmission including transmission 118 of residual image 206*b* and/or residual scene data cube and reconstructed residual and input scene images (or, reconstructed 3-D HSI data cube) and instructions may occur over a communications network. Information carriers suitable for embodying computer program instructions and data include all forms of non-volatile memory, including by way of example semiconductor memory devices. The information carriers can, for example, be EPROM, EEPROM, flash memory devices, magnetic disks, internal hard disks, removable disks, magneto-optical disks, CD-ROM, and/or DVD-ROM disks. The processor and the memory can be supplemented by, and/or incorporated in special purpose logic circuitry.

To provide for interaction with a user, the above described techniques can be implemented on a computing device having a display device. The display device can, for example, be a cathode ray tube (CRT) and/or a liquid crystal display (LCD) monitor, and/or a light emitting diode (LED) monitor. The interaction with a user can, for example, be a display of information to the user and a keyboard and a pointing device (e.g., a mouse or a trackball) by which the user can provide input to the computing device (e.g., interact with a user interface element). Other kinds of devices can be used to provide for interaction with a user. Other devices can, for example, be feedback provided to the user in any form of sensory feedback (e.g., visual feedback, auditory feedback, or tactile feedback). Input from the user can, for example, be received in any form, including acoustic, speech, and/or tactile input.

The above described systems and techniques can be implemented in a distributed computing system that includes a back-end component. The back-end component can, for example, be a data server, a middleware component, and/or an application server. The above described techniques can be implemented in a distributing computing system that includes a front-end component. The front-end component can, for example, be a client computing device having a graphical user interface, a Web browser through which a user can interact with an example implementation, and/or other graphical user interfaces for a transmitting device. The components of the system can be interconnected by any form or medium of digital data communication (e.g., a communication network). Examples of communication networks include a local area network (LAN), a wide area network (WAN), the Internet, wired networks, and/or wireless networks.

The system may be coupled to and/or include clients and servers. A client and a server are generally remote from each other and typically interact through a communication network. The relationship of client and server arises by virtue of computer programs running on the respective computing devices and having a client-server relationship to each other.

Communication networks may include packet-based networks, which can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network, 802.16 network, general packet radio service (GPRS) network, HiperLAN), and/or other packet-based networks. Circuit-based networks may include, for example, the public switched telephone network (PSTN), a private branch exchange (PBX), a wireless network (e.g., RAN, Bluetooth, code-division multiple access (CDMA) network, time division multiple access (TDMA) network, global system for mobile communications (GSM) network), and/or other circuit-based networks.

The computing device in imaging system 102 may include, for example, a computer, a computer with a browser device, a telephone, an IP phone, a mobile device (e.g., cellular phone, personal digital assistant (PDA) device, laptop computer, electronic mail device), and/or other communication devices. The browser device includes, for example, a computer (e.g., desktop computer, laptop computer) with a World Wide Web browser (e.g., INTERNET EXPLORER® available from Microsoft Corporation, of Redmond, Wash.). The mobile computing device includes, for example, a BLACKBERRY® provided by Research In Motion Limited of Waterloo, Ontario, Canada.

"Comprise," "include," and/or plural forms of each are open ended and include the listed parts and can include additional parts that are not listed. "And/or" is open ended and includes one or more of the listed parts and combinations of the listed parts.

Although the above disclosure discusses what is currently considered to be a variety of useful embodiments, it is to be understood that such detail is solely for that purpose, and that the appended claims are not limited to the disclosed embodiments, but, on the contrary, are intended to cover modifications and equivalent arrangements that are within the spirit and scope of the appended claims.

What is claimed is:

1. A method for image processing, comprising:
   receiving, at an image processor, an input datacube created from a scan of a scene and from which an input scene image is derived, wherein the input datacube is a three dimensional set of measurements at a plurality of cross-scan locations (x's), along-scan locations (y's), and wavelength values (w's);
   transforming, at the image processor, the input datacube into a residual datacube by projecting out one or more basis vectors from each spatial pixel in the input datacube, the residual datacube being used to derive a three dimensional (3D) residual image, wherein each spatial pixel specifies a cross-scan location (x), an along-scan location (y), and contains measurements at a plurality of wavelengths (w's) in the input scene image;
   for each of a plurality of focal plane pixels in a focal plane used to scan the scene, identifying samples of the 3D residual image contributed by a subject focal plane pixel, wherein the samples are generated at a plurality of along-scan locations (y's) for a specific cross-scan location (x) and a specific wavelength (w) as the subject focal plane pixel is scanned along the scene;
   determining, at the image processor, a statistical parameter value for the identified samples of each focal plane pixel, the determined statistical parameter value encompassing the plurality of along-scan locations (y's) for the specific cross-scan location (x) and the specific wavelength (w);
   identifying, at the image processor, anomalous focal plane pixels based upon a comparison of the determined statistical parameter value of each focal plane pixel in the 3D residual image with the respective determined statistical parameter values of remaining focal plane pixels;
   comparing, at the image processor, residual values at the specific cross-scan location (x) and the specific wavelength (w) for each scanned sample of the identified anomalous focal plane pixels with values of corresponding scanned samples in the input datacube;
   determining, at the image processor, an estimation of at least one of a gain correction value and an offset correction value for the anomalous focal plane pixels based upon the comparing; and
   reconstructing, at the image processor, the input datacube based upon the estimation of at least one of the gain correction value and the offset correction value.

2. The method of claim 1 further comprising:
   eliminating, at the image processor, at least one sample of the anomalous focal plane pixels having a residual value outside a range of values, wherein the at least one sample of the anomalous focal plane pixels when included for the determining the estimation contributes to the gain and offset correction values for the anomalous focal plane pixels.

3. The method of claim 2 further comprising:
   spatially analyzing, at the image processor, magnitudes of residual spectra of each spatial pixel to identify one or more spatial pixels whose residual spectrum contains scene structure from the input datacube.

4. The method of claim 3, wherein the samples of the spatial pixels of the residual datacube identified as containing scene structure are eliminated from the residual datacube prior to the determining the statistical parameter values of the spatial samples of the residual image for the focal plane pixels and prior to the comparing the residual values for the identified anomalous focal plane pixels with the values of corresponding focal plane pixels in the input datacube to prevent errors in the gain and offset correction values.

5. The method of claim 1 further comprising:
   Determining, at the image processor, additional basis vectors to characterize the input data cube and remove scene structure from the residual datacube to enable using additional residual samples for identification and correction of anomalous focal plane pixels.

6. The method of claim 1, wherein the determining the estimation of the at least one of the gain correction value and the offset correction value comprises determining only the gain correction value when the offset correction value is known to be zero.

7. The method of claim 1, wherein the determined gain correction value and the offset correction value of each focal plane pixel is applied to corresponding focal plane pixels in multiple input scene images for the reconstructing of additional scene images.

8. The method of claim 1, wherein the gain correction value is determined based upon a slope of a line plotted to fit a residual reflectivity for samples of a specified focal plane pixel as a function of an input scene reflectivity for the samples of the specified focal plane pixel, and wherein the offset correction value is determined based upon a value of the plotted line when the input scene reflectivity is zero.

9. The method of claim 8, wherein the curve is a scatter plot fitted for the focal plane pixel samples such that at least one outlier focal plane pixel is not included in the fitted scatter plot.

10. The method of claim 1 further comprising:
repeating in a feedback loop, at the image processor, said determining the statistical parameter values, said identifying, and said comparing after the gain and offset correction values are determined to further refine the determined estimation of gain and offset correction values.

11. The method of claim 1, wherein the statistical parameter value is at least one of an average value, a mean, a median, a standard deviation, or combinations thereof.

12. An image processing system comprising:
A memory having computer executable instructions thereupon;
an image processor coupled to the memory, the computer executable instructions when executed by the image processor cause the image processor to:
receive an input datacube created from a scan of a scene and from which an input image is derived, wherein the input datacube is a three dimensional set of measurements at a plurality of cross-scan locations (x's), along-scan locations (y's), and wavelength values (w's);
transform the input datacube into a residual datacube by projecting out one or more basis vectors from each spatial pixel in the input datacube, the residual datacube being used to derive a three dimensional (3D) residual image, wherein each spatial pixel specifies a cross-scan location (x), an along-scan location (y), and contains measurements at a plurality of wavelengths (w's) in the input scene image;
for each of a plurality of focal plane pixels in a focal plane used to scan the scene, identify samples of the 3D residual image contributed by a subject focal plane pixel, wherein the samples are generated at a plurality of along-scan locations (y's) for a specific cross-scan location (x) and a specific wavelength (w) as the subject focal plane pixel is scanned along the scene;
determine a statistical parameter value for the identified samples of each focal plane pixel, the determined statistical parameter value encompassing the plurality of along-scan locations (y's) for the specific cross-scan location (x) and the specific wavelength (w);
identify anomalous focal plane pixels based upon a comparison of the determined statistical parameter value of each focal plane pixel in the 3D residual image with the respective determined statistical parameter values of remaining focal plane pixels;
perform another comparison of residual values at the specific cross-scan location (x) and the specific wavelength (w) for each scanned sample of the identified anomalous focal plane pixels with values of corresponding scanned samples in the input datacube;
determine an estimation of at least one of a gain correction value and an offset correction value for the anomalous focal plane pixels based upon the comparison; and
reconstruct the input datacube based upon the estimation of at least one of the gain correction value and the offset correction value.

13. The image processing system of claim 12, wherein the computer executable instructions when executed by the image processor further cause the image processor to:
eliminate at least one sample of the anomalous focal plane pixels having a residual value outside a range of values, wherein the at least one sample of the anomalous focal plane pixels when included for the estimation contributes to the gain and offset correction value for the anomalous focal plane pixels.

14. The image processing system of claim 13, wherein the computer executable instructions when executed by the image processor further cause the image processor to:
spatially analyze magnitudes of residual spectra of each spatial pixel to identify one or more spatial pixels whose residual spectrum contains scene structure from the input datacube.

15. The image processing system of claim 14, wherein the samples of the spatial pixels of the residual datacube identified as containing scene structure are eliminated from the residual datacube prior to the determining the statistical parameter values of the spatial samples of the residual image for the focal plane pixels and prior to the comparing the residula values for the identified anomalous focal plane pixels with the values of corresponding focal plane pixels in the input datacube to prevent errors in the estimation of the gain and offset correction values.

16. The image processing system of claim 12, wherein the computer executable instructions when executed by the image processor further cause the image processor to:
determine additional basis vectors to characterize the input datacube and remove scene structure from the residual datacube to enable using additional residual samples for identification and correction of anomalous focal plane pixels.

17. The image processing system of claim 12, wherein the image processor determines the estimation of the least one of the gain correction value and the offset correction value by determining only the gain correction value when the offset correction value is known to be zero.

18. The image processing system of claim 12, wherein in the determined gain correction value and the offset correction value of each focal plane pixel is applied to corresponding focal plane pixels in multiple input scene image for a reconstruction of additional scene images.

19. The image processing system of claim 12, wherein the gain correction value is determined based upon a slope of a line plotted to fit a residual reflectivity for samples of a specified focal plane pixel as a function of an input scene reflectivity for the samples of the specified focal plane pixel, and wherein the offset correction value is determined based upon a value of the plotted line when the input scene reflectivity is zero.

20. A tangible non-transitory computer-readable storage medium having computer-readable instructions stored therein for processing images, which when executed by one or more processors cause the one or more processors to:
receive an input datacube from which an input image is derived, wherein the input datacube is a three dimensional set of measurements at a plurality of cross-scan locations (x's), along-scan locations (y's), and wavelength values (w's);
transform the input datacube into a residual datacube by projecting out one or more basis vectors from each spatial pixel in the input datacube, the residual datacube being used to derive a three dimensional (3D) residual image, wherein each spatial pixel specifies a cross-scan location (x), an along-scan location (y), and contains measurements at a plurality of wavelengths (w's) in the input scene image;

for each of a plurality of focal plane pixels in a focal plane used to scan the scene, identify samples of the 3D residual image contributed by a subject focal plane pixel, wherein the samples are generated at a plurality of along-scan locations (y's) for a specific cross-scan location (x) and a specific wavelength (w) as the subject focal plane pixel is scanned along the scene;

determine a statistical parameter value for the identified samples of each focal plane pixel, the determined statistical parameter value encompassing the plurality of along-scan locations (y's) for the specific cross-scan location (x) and the specific wavelength (w);

identify anomalous focal plane pixels based upon a comparison of the determined statistical parameter values of remaining focal plane pixels;

perform another comparison of residual values at the specific cross-scan location (x) and the specific wavelength (w) for each scanned sample of the identified anomalous focal plane pixels with values of corresponding scanned samples in the input datacube;

determine an estimation of at least one of a gain correction value and an offset correction value for the anomalous focal plane pixels based upon the comparison; and reconstruct the input datacube based upon the estimation of at least one of the gain correction value and the offset correction value.

\* \* \* \* \*